(12) United States Patent
Han et al.

(10) Patent No.: US 10,605,944 B2
(45) Date of Patent: Mar. 31, 2020

(54) FORMATION ACOUSTIC PROPERTY MEASUREMENT WITH BEAM-ANGLED TRANSDUCER ARRAY

(71) Applicant: Baker Hughes, a GE company, LLC, Houston, TX (US)

(72) Inventors: Wei Han, Sugar Land, TX (US); Jason M. Harris, Cypress, TX (US); Douglas J. Patterson, Magnolia, TX (US); Stephen Dymmock, Spring, TX (US); John Dahl, Spring, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 4 days.

(21) Appl. No.: 15/632,024

(22) Filed: Jun. 23, 2017

(65) Prior Publication Data

US 2018/0372902 A1     Dec. 27, 2018

(51) Int. Cl.
*G01V 1/50* (2006.01)

(52) U.S. Cl.
CPC ........ *G01V 1/50* (2013.01); *G01V 2210/1299* (2013.01); *G01V 2210/1429* (2013.01); *G01V 2210/6242* (2013.01); *G01V 2210/74* (2013.01)

(58) Field of Classification Search
CPC ............. G01V 1/50; G01V 2210/1429; G01V 2210/6242; G01V 2210/74; G01V 2210/1299
See application file for complete search history.

(56) References Cited

U.S. PATENT DOCUMENTS

| 5,521,882 | A * | 5/1996 | D'Angelo | G01V 1/303 |
| | | | | 324/335 |
| 6,483,777 | B1 | 11/2002 | Zeroug | |
| 6,930,616 | B2 | 8/2005 | Tang et al. | |
| 6,985,086 | B2 | 1/2006 | Tang et al. | |
| 7,672,784 | B2 | 3/2010 | Zheng et al. | |
| 7,913,806 | B2 | 3/2011 | Pabon et al. | |
| 7,966,882 | B2 | 6/2011 | Greenwood | |
| 8,289,808 | B2 | 10/2012 | Johnson et al. | |
| 8,456,952 | B2 | 6/2013 | Tang et al. | |
| 8,547,791 | B2 | 10/2013 | Vu et al. | |

(Continued)

FOREIGN PATENT DOCUMENTS

WO     2017007745 A1     1/2017

*Primary Examiner* — Ian J Lobo
(74) *Attorney, Agent, or Firm* — Mossman, Kumar & Tyler, P.C.

(57) ABSTRACT

Methods and apparatus for performing formation evaluation in a borehole intersecting an earth formation. Methods may include exciting at a first borehole depth at least one critical refraction wave by steering an acoustic beam transmitted by at least one ultrasonic transmitter to an interface in the formation to intercept the interface at a critical angle; receiving an acoustic signal comprising critical refraction wave data at a logging tool in the borehole; and obtaining a wave property measurement from the critical refraction wave data. The interface may be the borehole wall in an open-hole well or behind casing. Methods include using ultrasonic transmitter(s) to generate the plurality of acoustic beams, identifying critical refraction wave data within the response signal corresponding to the at least one critical refraction wave, and obtaining the wave property measurement from the critical refraction wave data.

19 Claims, 22 Drawing Sheets

(56) References Cited

U.S. PATENT DOCUMENTS

| | | |
|---|---|---|
| 8,942,063 B2 | 1/2015 | Vu et al. |
| 9,063,251 B2 | 6/2015 | Moos |
| 9,389,330 B2 | 7/2016 | Khajeh et al. |
| 2004/0095847 A1 | 5/2004 | Hassan et al. |
| 2009/0114472 A1* | 5/2009 | Winkler ................ E21B 47/082 181/105 |
| 2009/0236145 A1* | 9/2009 | Bennett .................... E21B 7/04 175/24 |
| 2010/0020639 A1* | 1/2010 | Sinha ........................ G01V 1/48 367/31 |
| 2014/0056111 A1* | 2/2014 | Vu ...................... E21B 47/0005 367/180 |
| 2015/0268367 A1 | 9/2015 | Khajeh et al. |
| 2016/0025884 A1 | 1/2016 | Difoggio et al. |
| 2016/0109604 A1 | 4/2016 | Zeroug et al. |
| 2016/0170063 A1 | 6/2016 | Leggett et al. |
| 2017/0145804 A1* | 5/2017 | Wessling ................ G01V 1/52 |

* cited by examiner

FORMATION ACOUSTIC PROPERTY MEASUREMENT WITH BEAM-ANGLED TRANSDUCER ARRAY

FIELD OF THE DISCLOSURE

This disclosure generally relates to borehole tools, and in particular to instruments for measuring a parameter of interest in the borehole. More specifically, the present disclosure relates to a method and apparatus for measuring an acoustic characteristic such as formation shear velocity using particular types of subsurface acoustic waves after these waves traverse earth formations adjoining a borehole or passing through a portion of the subsurface.

BACKGROUND OF THE DISCLOSURE

Drilling wells for various purposes is well-known. Such wells may be drilled for geothermal purposes, to produce hydrocarbons (e.g., oil and gas), to produce water, and so on. Well depth may range from a few thousand feet to 25,000 feet or more.

Tools for measurement of properties of the well or the formation may be conveyed downhole. Tools having an acoustic device for measuring acoustic velocities of subsurface formations (during or after drilling of the wellbores) are well known. These tools may be incorporated in drilling systems (e.g., "logging-while-drilling" ('LWD') or "measurement-while-drilling" ('MWD') systems) or an after-drilling wireline logging system and used in determining formation characteristics and the location of fractures or other boundaries with respect to the tool. Tools for imaging of acoustically reflective boundaries using directional acoustic sources are also known.

SUMMARY OF THE DISCLOSURE

In aspects, the present disclosure is related to methods and apparatus for performing formation evaluation in a borehole intersecting an earth formation. Methods may include exciting at a first borehole depth at least one critical refraction wave by steering an acoustic beam transmitted by at least one ultrasonic transmitter to an interface in the formation to intercept the interface at a critical angle; receiving an acoustic signal comprising critical refraction wave data at a logging tool in the borehole; and obtaining a wave property measurement from the critical refraction wave data.

The interface may lie at a radial distance from a longitudinal axis of the tool equal to at least one of: i) a distance from the longitudinal axis of the tool to a wall of the borehole; and ii) a second distance greater than the distance from the longitudinal axis of the tool to the wall of the borehole. The acoustic beam may be one of a plurality of acoustic beams, and exciting the at least one critical refraction wave may include using the at least one ultrasonic transmitter to generate the plurality of acoustic beams on a single trip in the borehole, each acoustic beam of the plurality having an effective angle of incidence with the interface; generating a response signal at at least one acoustic receiver on the logging tool responsive to the acoustic signal, the acoustic signal resulting from the plurality of acoustic beams, wherein the acoustic signal comprises at least one critical refraction wave excited by the acoustic beam of the plurality of acoustic beams; and identifying critical refraction wave data within the response signal corresponding to the at least one critical refraction wave; and obtaining the wave property measurement from the critical refraction wave data.

Identifying critical refraction wave data may include separating formation acoustic wave signals and compressional and shear wave signals; and identifying optimal signals using signal quality factors. The at least one critical refraction wave excited by the acoustic beam comprises at least one of: i) a compressional head wave; ii) a shear head wave; iii) a borehole guided wave; and iv) a reflection wave from a discontinuity boundary within the formation. The interface may be a fluid-solid interface. The at least one critical refraction wave may propagate at least one of: i) circumferentially in the formation around the borehole; and ii) helically in the formation around the borehole.

The wave property measurement may comprise at least one of: i) a compressional velocity measurement; ii) a shear velocity measurement; iii) a compressional wave attenuation measurement; iv) a shear wave attenuation measurement; v) a borehole guided wave velocity measurement; and vi) a borehole guided wave attenuation measurement. Methods may include estimating a location in the formation for the interface. The first beam of the plurality of acoustic beams may have a first angle of incidence and a second beam of the plurality of acoustic beams may have a second angle of incidence different than the first angle of incidence.

Methods may include performing at least one of: i) estimating a formation porosity from the wave property measurement; ii) detecting a fracture with the wave property measurement; iii) estimating a fracture location with the wave property measurement; iv) estimating a fracture orientation with the wave property measurement; v) estimating Poisson's ratio of the formation with the wave property measurement; vi) estimating Young's modulus of the formation with the wave property measurement; vii) estimating a bulk modulus of the formation with the wave property measurement; viii) estimating a shear modulus of the formation with the wave property measurement; ix) conducting fluid typing of a fluid in the formation with the wave property measurement; and x) estimating a fluid saturation for a fluid of the formation with the wave property measurement. The center of mass of the logging tool may be eccentered in the borehole. Methods may include conducting further operations in dependence upon the wave property measurement.

Methods may include exciting at a second borehole depth different than the first borehole depth another critical refraction wave by steering a second acoustic beam transmitted by the at least one ultrasonic transmitter to the interface to intercept the interface at a second critical angle different than the first critical angle; receiving a second acoustic signal comprising additional critical refraction wave data at the logging tool; and obtaining a second wave property measurement from the additional critical refraction wave data.

Methods may include exciting a second critical refraction wave at the first borehole depth by steering a second acoustic beam transmitted by the at least one ultrasonic transmitter to the interface to intercept the interface at a second critical angle different than the first critical angle; and obtaining a second wave property measurement from additional critical refraction wave data representing the second critical refraction wave at the first borehole depth, wherein the acoustic signal comprises the additional critical refraction wave data.

Methods may include exciting a second critical refraction wave at the first borehole depth by steering a second acoustic beam transmitted by the at least one ultrasonic transmitter to the interface to intercept the interface at the first critical angle at a frequency different than the frequency of the first critical refraction wave; and obtaining a second wave property measurement from additional critical refraction wave data representing the second critical refraction wave at the first borehole depth, wherein the acoustic signal comprises the additional critical refraction wave data.

Methods may include orienting one or more of the at least one ultrasonic transmitter at an angle with respect to a longitudinal axis of the logging tool resulting in flexural wave energy sufficient to produce a shear head wave in an acoustically slow formation. Methods may include exciting at least one additional critical refraction wave at each of a plurality of additional azimuths at a plurality of borehole depths; receiving an acoustic signal comprising critical refraction wave data at the logging tool at each of the plurality of additional azimuths at the plurality of borehole depths in the borehole; and obtaining a plurality of wave property measurements from the critical refraction wave data; and generating a full-resolution two-dimensional image of the property for the borehole.

Further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation information.

Apparatus embodiments may include well logging systems, or components thereof, for logging in a borehole intersecting an earth formation. Apparatus may include at least one transmitter in the borehole configured to excite at a first borehole depth at least one critical refraction wave by steering an acoustic beam transmitted by at least one ultrasonic transmitter to an interface in the formation to intercept the interface at a critical angle; at least one receiver in the borehole configured to receive an acoustic signal comprising critical refraction wave data at a logging tool in the borehole; at least one processor on the tool configured to a obtain a wave property measurement from the critical refraction wave data.

Methods as described above utilize at least one processor. Apparatus embodiments may include, in addition to specialized borehole measurement equipment and conveyance apparatus, at least one processor and a computer memory accessible to the at least one processor comprising a computer-readable medium having instructions thereon that, when executed, causes the at least one processor to perform methods described above.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
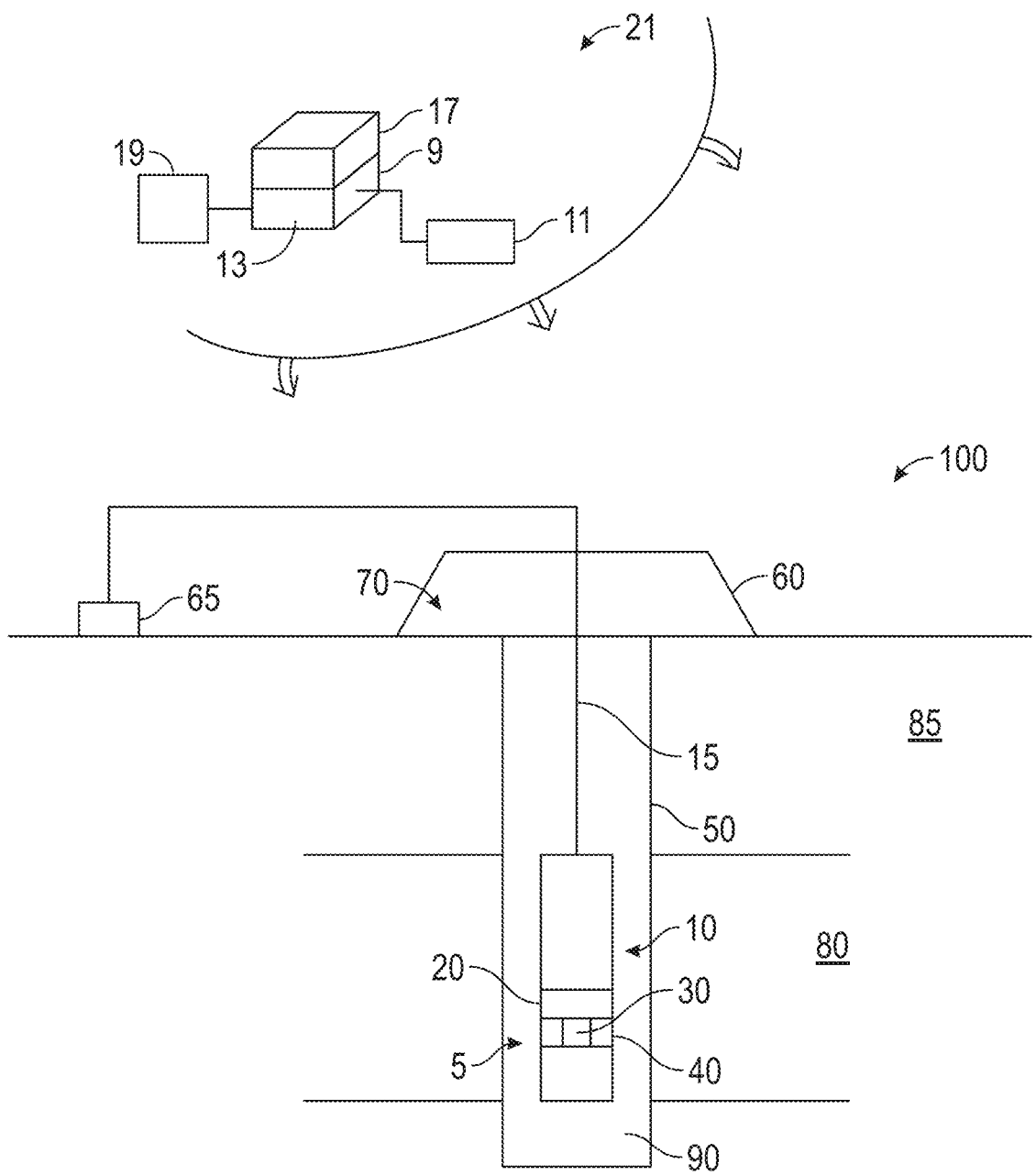
FIGS. 1A and 1B illustrate systems in accordance with embodiments of the present disclosure.

Aspects of the present disclosure relate to apparatus and methods for acoustic well logging, including measurement and interpretation of physical phenomena indicative of parameters of interest of the formation, the borehole, or the downhole fluids therein. Techniques described herein are particularly suited to taking borehole acoustic measurements and using these measurements for determining properties of subsurface formations including, for example, estimating properties relating to compressional and shear wave velocities, estimation of porosity at high resolution, acoustic slowness in thin beds, detection of acoustically reflective boundaries (referred to herein as 'reflectors' or 'boundaries'), e.g., geologic structures such as fractures or an aperture, and related parameters of interest (e.g., properties of these boundaries), such as, for example, fluid in fractures. The term "boundary", is meant to include physical features (e.g., geologic structures such as fractures, faults, and bedding planes) which are associated with an elastic impedance contrast strong enough to generate a detection event.

Acoustic evaluation to estimate the properties of a subsurface formation has traditionally involved measurement of compressional and shear wave velocities by exciting acoustic waves using a transmitter and receiving compressional (P-waves) and shear waves (S-waves) through formation and analyzing signals received by an array of receivers. It is also common practice to measure acoustic waves propagating through the borehole.

For example, U.S. Pat. No. 6,930,616 to Tang et al. having the same assignee as the present disclosure and the contents of which are incorporated herein by reference discloses a method in which array quadrupole data obtained in a LWD environment are processed to determine the shear velocity of an earth formation taking into account dispersion effects caused by the logging tool. When this processing is done in an azimuthally anisotropic formation, the shear velocity that is obtained is the slow shear velocity. When 4C (cross-dipole) data are also obtained, then both the fast and slow shear velocities of an azimuthally anisotropic formation can be obtained.

Conventional sonic logging tools operate at low frequencies (up to about 20 kHz) with a transmitter-receiver spacing range from 5-7 feet to about 15-20 feet, and a receiver spacing range of 0.50-1.0 foot. The radial depth of investigation is only about one foot. The low frequency, long tool size, and wide receiver spacing have a limited measurement resolution and a low detectability for small features such as fractures.

Ultrasonic normal-incidence pulse-echo transducers operating at 250-500 kHz are widely used in borehole standoff and imaging measurements. The acoustic wave is propagated through mud and is reflected by the borehole wall and received by the transducer. However, formation properties such as acoustic velocity and porosity cannot be estimated from ultrasonic pulse-echo measurements.

Aspects of the present disclosure include exciting ultrasonic critical refraction waves in a formation to measure formation compressional and shear velocity. The ultrasonic critical refraction waves are excited for each measurement at different critical incident beam angles. Techniques disclosed herein include using an instrument incorporated in one or more borehole tools comprising a transmitter array, an isolator, and a receiver array. The optional acoustic isolator may be provided to attenuate and isolate borehole-fluid reflections and direct mode waves in the logging tool from the receiver.

Embodiments may include a multiple-element transmitter array (or multiple individual transmitters) to focus and steer beams at critical incident angles at a fluid-formation interface in order to excite formation compressional or shear head waves. To cover a wide formation velocity range, the center of the transmitting beam can be focused and steered along the formation wall (by adjusting transmitting element firing time delay or phase delay) onto a first critical angle for exciting compressional head waves, and onto a second, larger critical angle for generating shear head waves.

Aspects of the disclosure include performing formation evaluation in a borehole intersecting an earth formation. Methods may include exciting at a first borehole depth at least one critical refraction wave by steering an acoustic beam transmitted by at least one ultrasonic transmitter to an interface in the formation to intercept the interface at a critical angle; receiving an acoustic signal comprising critical refraction wave data at a logging tool in the borehole; and obtaining a wave property measurement from the critical refraction wave data. The interface may be the borehole wall, and the technique may be employed in both open-hole and cased-well (e.g., behind casing) applications.

As described herein, transmitted beams may be focused and steered onto a mud-formation interface at incident angles that excite the refracted compressional (or shear) wave in the formation. Transmitter arrays may have individual elements that are tilted at different oblique incident angles to selectively excite compressional head waves and shear waves in the formation, respectively. The angles of receiver elements may be tilted to increase detection sensitivity to formation refracted waves. Transducers (transmitters and receivers) may be placed axially on the tool, or alternatively, placed azimuthally around the wellbore, or along a helical path on the wellbore.

Methods may include measuring formation compressional and shear acoustic velocities to enable determination of formation porosity and for the detection of fracture in open-hole (wire-line and LWD). Methods disclosed herein may offer advantages of finer measurement resolution, higher sensitivity, and better mode-conversion energy efficiency over conventional methods.

In addition to the resolution and sensitivity limitations, conventional methods (e.g., monopole logging) substantially lack conversion of incident energy into critically refracted waves in the formation. A typical monopole source has an omnidirectional broad beam pattern—that is, it evenly spreads out. So only an insubstantial portion of transmitting energy of such a source—the portion with beam angles that fall around the first and the second critical angles (less than 1 percent)—would contribute to refraction head waves in the formation. This may be referred to as "substantially no transmitting energy." At other angles, a large portion of the transmitted energy is reflected back and transmitted into formation without contributing to refraction waves.

High signal attenuation in mud (and the formation), and reflection over-sensitivity (from much shorter wavelength, low penetration depth) to surface roughness are two major limitations for practical use of a high-frequency (250 kHz and above) measurement. Thus, conventional low-frequency sonic logging tools have limited detection resolution, and high frequency standoff/imaging methods are unable to determine formation properties such as compressional and shear velocities. In contrast, embodiments of the present disclosure may employ acoustic waves at operating frequencies below 250 kHz, and preferably below 200 kHz. In some implementations, the operating frequency may range from 50 to 150 kHz.

Techniques disclosed herein may overcome measurement resolution and sensitivity limitations of current low-frequency sonic logging methods and high-frequency ultrasonic pulse-echo methods. In addition, angled-beam or focusing methods may allow better energy efficiency, converting incident energy into critically refracted waves propagating along the formation wall. Generating an angled beam or a focused beam around the critical angles (i.e., the first critical angle for compressional measurements, and the second critically angle for shear measurements) concentrates significantly more energy at the critical angles, and thus may be much more efficient exciting formation refraction waves than normal-angled or omnidirectional transducers, where a majority of acoustic energy is reflected back and transmitted into the formation, being lost and not received. Aspects of the disclosure may generate more quantitative information about formation properties such as compressional velocity (slow and fast formations) and shear velocity (fast formations). Using a focused and steered transmitter beam sweep (e.g., at a variable angle of incidence), and along with signal detection and slowness measurement, may allow identification of an optimum effective angle of incidence with the interface and thus maximize head wave signals for a given formation. Using a wide and variable incident angle sweep may also lead to a wider dynamic range and better sensitivity for head wave measurement in different formations.

Aspects of the present disclosure relate to using at least one acoustic instrument as part of one or more downhole acoustic well logging tools or distributed sensor systems to produce acoustic information responsive to an acoustic wave from the earth formation. The sensor may include at least one acoustic transmitter and at least one acoustic receiver disposed on a carrier in the borehole. A receiver and transmitter may be implemented as the same transducer, different transducers, or one or more transducer arrays. The information is indicative of a parameter of interest. The term "information" as used herein includes any form of information (analog, digital, EM, printed, etc.), and may include one or more of: raw data, processed data, and signals.

Techniques of the present disclosure may be iteratively applied at a plurality of borehole depths, on a continuously updated basis. A center of mass of the logging tool may be eccentered in the borehole. As one example, one or more transmitters or receivers may be positioned on the tool which is conveyed in the borehole. A series of pulses may be transmitted from various positions on the tool as the tool moves within the borehole.

Methods may include estimating a parameter of interest from the information, evaluating the formation using the parameter of interest, and/or performing further borehole or formation operations in dependence upon the parameter, the location of the boundary, or other parameters of interest derived from these.

Aspects of the present disclosure are subject to application in various different embodiments. A downhole tool may be coupled or combined with additional tools, including, e.g., some or all the information processing system, as shown in FIG. 1A, discussed in further detail below. As described herein, "borehole" or "wellbore" refers to a single hole that makes up all or part of a drilled well. Depending on the configuration, systems shown herein may be used during drilling and/or after the wellbore has been formed, including, in some instances, after the installation of casing or production infrastructure. While a land system is shown, the teachings of the present disclosure may also be utilized in offshore or subsea applications. As described herein, "formations" refer to the various features and materials that may be encountered in a subsurface environment and surround the borehole.

Figure 1B:
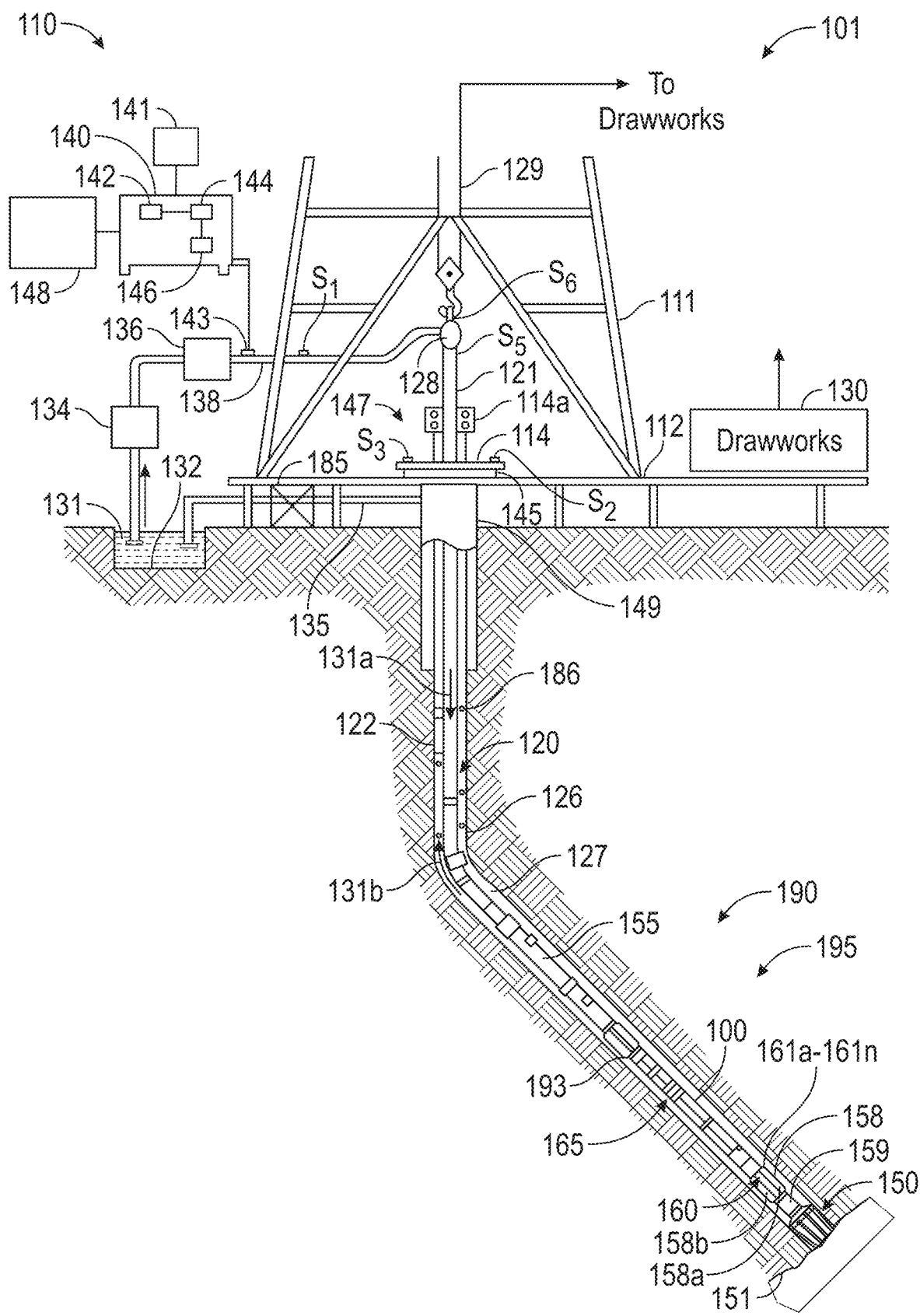

FIGS. 1A and 1B illustrate systems in accordance with embodiments of the present disclosure. FIG. 1A schematically illustrates a downhole acoustic logging system 100 having a downhole tool 10 configured to acquire information using an instrument 5, comprising at least one acoustic transmitter 30 and at least one acoustic receiver 40, while in a borehole 50 in an earth formation 85 and estimate a parameter of interest of a volume of interest 80 of the formation 85. A plurality of transmitters and/or receivers may be used, including transmitters and/or receivers in an azimuthal array about the circumference of the tool. The instrument 5 may include at least one phased array module capable of sending acoustic pulses to and receiving signals from a plurality of incidence angles via the use of beamforming.

The system 100 may include a conventional derrick 60 erected on a derrick floor 70. A conveyance device (carrier 15) which may be rigid or non-rigid, may be configured to convey the downhole tool 10 in the wellbore 50 intersecting the earth formation 80. Drilling fluid ('mud') 90 may be present in the borehole 50. The carrier 15 may be a wireline, coiled tubing, a slickline, an e-line, a drill string, etc. Downhole tool 10 may be coupled or combined with additional tools, including, e.g., some or all the information processing system (inset). Thus, depending on the configuration, the tool 10 may be used during drilling and/or after the wellbore 50 has been formed. While a land system is shown, the teachings of the present disclosure may also be utilized in offshore or subsea applications. The carrier 15 may include embedded conductors for power and/or data for providing signal and/or power communication between the surface and downhole equipment (e.g., a seven conductor cable). The carrier 15 may include a bottom hole assembly, which may include a drilling motor for rotating a drill bit.

A surface control system 65 receives signals from downhole sensor 5 and other sensors used in the system 100 and processes such signals according to programmed instructions provided to the surface control system 65. The surface control system 65 may display desired parameters and other information on a display/monitor that is utilized by an operator. The surface control system 65 may further communicate with a downhole control system 20 at a suitable location on downhole tool 10. The surface control system 65 may process data relating to the operations and data from the instrument 5, and may control one or more downhole operations performed by system 100.

In one embodiment, electronics associated with instrument 5 may be configured to record and/or process the information obtained. Certain embodiments of the present disclosure may be implemented with a hardware environment 21 that includes an information processor 17, an information storage medium 13, an input device 11, processor memory 9, and may include peripheral information storage medium 19. The hardware environment may be in the well, at the rig, or at a remote location. Moreover, the several components of the hardware environment may be distributed among those locations. The input device 11 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, circuitry associated with the instrument may be configured to take measurements at a plurality of azimuthal orientations as the tool moves along the longitudinal axis of the borehole ('axially'). As one example, this may be achieved by rotating an acoustic transducer as the instrument is conveyed in the borehole. These measurements may be substantially continuous, which may be defined as being repeated at very small increments of depth and azimuth, such that the resulting information has sufficient scope and resolution to provide an image of borehole parameters (e.g., acoustic properties of the formation at the borehole).

In other embodiments, circuitry may be located elsewhere (e.g., at the surface, or remotely). To perform the treatments during a single trip, the tool may use a high bandwidth transmission to transmit the information acquired by instrument 5 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control operations in "substantially real-time."

One point of novelty of the system illustrated in FIG. 1A is that the at least one processor may be configured to perform certain methods (discussed below) that are not in the prior art. A surface control system or downhole control system may be configured to control the tool and/or the instrument described above and any incorporated sensors and to estimate a parameter of interest according to methods described herein.

Aspects of the present disclosure are subject to application in various different embodiments. In some general embodiments, carrier 15 is implemented as a tool string of a drilling system, and the acoustic wellbore logging may be characterized as "logging-while-drilling" (LWD) or "measurement-while-drilling" (MWD) operations.

FIG. 1B shows an exemplary embodiment of a system for evaluation of an earth formation using measurements from an acoustic logging system. The system 101 includes a carrier 111 that is shown disposed in a wellbore or borehole 126 that penetrates at least one earth formation 195. The system 101 also includes a tool 110 configured for taking acoustic measurements in the borehole.

Depending on the configuration, the system 101 may be used during drilling and/or after the wellbore 112 has been formed, including, in some instances after the installation of casing or production infrastructure. As described herein, "formations" refer to the various features and materials that may be encountered in a subsurface environment and surround the borehole. The term "information" includes, but is not limited to, raw data, processed data, and signals.

FIG. 1B is a schematic diagram of an exemplary drilling system 101 according to one embodiment of the disclosure.

FIG. 1B shows a drill string 120 that includes a bottomhole assembly (BHA) 190 conveyed in a borehole 126. The drilling system 101 includes a conventional derrick 111 erected on a platform or floor 112 which supports a rotary table 114 that is rotated by a prime mover, such as an electric motor (not shown), at a desired rotational speed. A tubing (such as jointed drill pipe 122), having the drilling assembly 190, attached at its bottom end extends from the surface to the bottom 151 of the borehole 126. A drill bit 150, attached to drilling assembly 190, disintegrates the geological formations when it is rotated to drill the borehole 126. The drill string 120 is coupled to a drawworks 130 via a Kelly joint 121, swivel 128 and line 129 through a pulley. Drawworks 130 is operated to control the weight on bit ("WOB"). The drill string 120 may be rotated by a top drive (not shown) instead of by the prime mover and the rotary table 114. Alternatively, a coiled-tubing may be used as the tubing 122. A tubing injector 114a may be used to convey the coiled-tubing having the drilling assembly attached to its bottom end. The operations of the drawworks 130 and the tubing injector 114a are known in the art and are thus not described in detail herein.

A suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor S1 in line 138 provides information about the fluid flow rate. A surface torque sensor S2 and a sensor S3 associated with the drill string 120 respectively provide information about the torque and the rotational speed of the drill string 120. Tubing injection speed is determined from the sensor S5, while the sensor S6 provides the hook load of the drill string 120.

Well control system 147 is placed at the top end of the borehole 126. The well control system 147 includes a surface blow-out-preventer (BOP) stack 115 and a surface choke 149 in communication with a wellbore annulus 127. The surface choke 149 can control the flow of fluid out of the borehole 126 to provide a back pressure as needed to control the well.

In some applications, the drill bit 150 is rotated by only rotating the drill pipe 122. However, in many other applications, a downhole motor 155 (mud motor) disposed in the BHA 190 also rotates the drill bit 150. The rate of penetration (ROP) for a given BHA largely depends on the WOB or the thrust force on the drill bit 150 and its rotational speed.

A surface control unit or controller 140 receives signals from the downhole sensors and devices via a sensor 143 placed in the fluid line 138 and signals from sensors S1-S6 and other sensors used in the system 101 and processes such signals according to programmed instructions provided to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole, and may control one or more operations of the downhole and surface devices. The data may be transmitted in analog or digital form.

The BHA 190 may also contain formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 195 surrounding the BHA 190. Such sensors are generally known in the art and for convenience are generally denoted herein by numeral 165, and include counterparts to instrument 5 described above with respect to FIG. 1A. The BHA 190 may further include a variety of other sensors and devices 159 for determining one or more properties of the BHA 190 (such as vibration, bending moment, acceleration, oscillations, whirl, stick-slip, etc.), drilling operating parameters (such as weight-on-bit, fluid flow rate, pressure, temperature, rate of penetration, azimuth, tool face, drill bit rotation, etc.). For convenience, all such sensors are denoted by numeral 159.

The BHA 190 may include a steering apparatus or tool 158 for steering the drill bit 150 along a desired drilling path. In one aspect, the steering apparatus may include a steering unit 160, having a number of force application members 161a-161n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 158 having a bent sub and a first steering device 158a to orient the bent sub in the wellbore and the second steering device 158b to maintain the bent sub along a selected drilling direction. The steering unit 158, 160 may include near-bit inclinometers and magnetometers.

The drilling system 101 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 190 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 101 can include one or more downhole processors at a suitable location such as 193 on the BHA 190. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. While a drill string 120 is shown as a conveyance device for sensors 165, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 101 may include a bottomhole assembly and/or sensors and equipment for implementation of embodiments of the present disclosure on either a drill string or a wireline.

A point of novelty of the system illustrated in FIG. 1B is that the surface processor 142 and/or the downhole processor 193 are configured to perform certain methods (discussed below) that are not in the prior art. Surface processor 142 or downhole processor 193 may be configured to control mud pump 134, drawworks 130, rotary table 114, downhole motor 155, other components of the BHA 190, or other components of the drilling system 101. Surface processor 142 or downhole processor 193 may be configured to control sensors described above and to estimate a parameter of interest according to methods described herein.

Control of the systems herein may be carried out using one or more models using methods described below. For example, surface processor 142 or downhole processor 193 may be configured to modify drilling operations i) autonomously upon triggering conditions, ii) in response to operator commands, or iii) combinations of these. Such modifications may include changing drilling parameters, mud parameters, and so on. Control of these devices, and of the various processes of the drilling system generally, may be carried out in a completely automated fashion or through interaction with personnel via notifications, graphical representations, user interfaces and the like. Additionally or alternatively, surface processor or downhole processor may be configured for the creation of the model. Reference information accessible to the processor may also be used.

In some general embodiments, surface processor 142, downhole processor 193, or other processors (e.g. remote processors) may be configured to use at least one sensor to produce a corresponding signal, responsive in part to a reflection of an emitted wave, from each of a plurality of azimuthally distributed orientations about a BHA. In some general embodiments, surface processor 142, downhole processor 193, or other processors (e.g. remote processors) may be configured to operate the tool 101 to excite and measure acoustic signals.

Mathematical models, look-up tables, or other models representing relationships between the signals and the values of the formation properties may be used to characterize operations in the formation or the formation itself, optimize one or more operational parameters of a production or development, and so on. The system may carry out these actions through notifications, advice, and/or intelligent control.

Figure 2A:
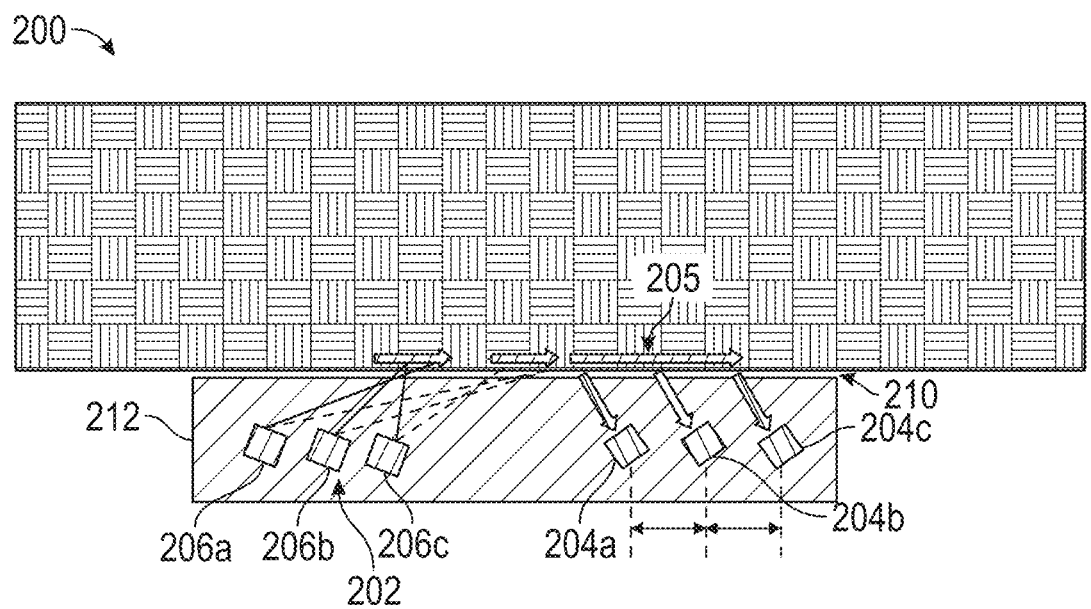
FIGS. 2A & 2B show schematic views of tools in accordance with embodiments of the present disclosure.
Figure 2B:
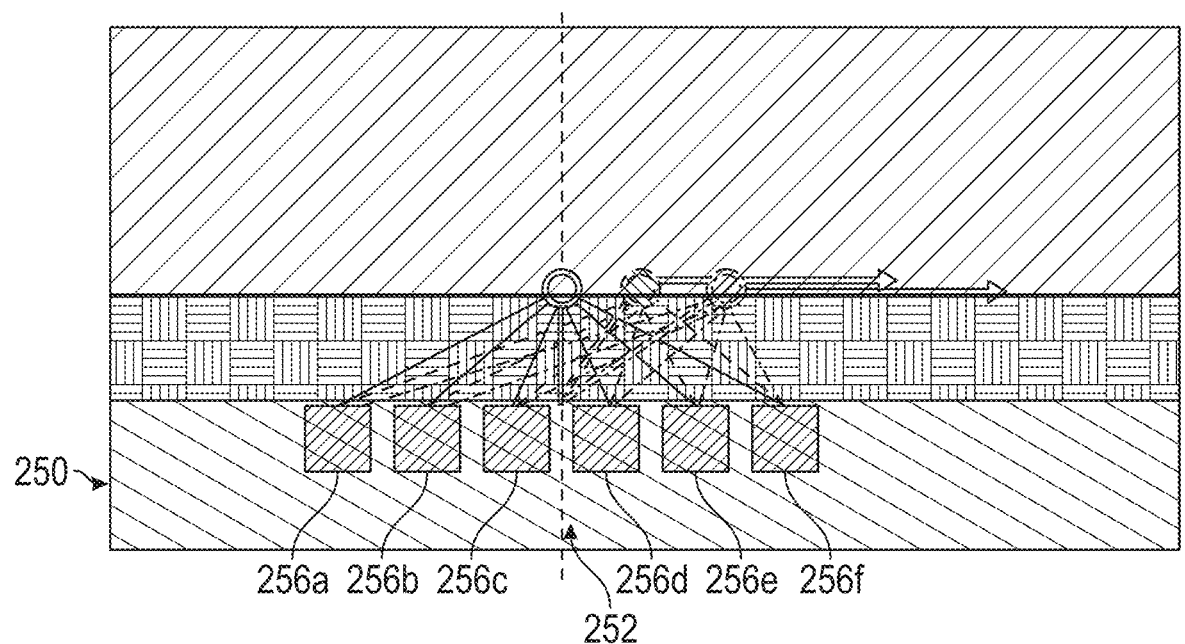

FIGS. 1A and 1B illustrate systems in accordance with embodiments of the present disclosure. FIGS. 2A & 2B show schematic views of tools in accordance with embodiments of the present disclosure. FIG. 2A shows an open-hole logging tool 200 with an array 202 of individual transmitters 206a, 206b, 206c and multiple receivers 204a, 204b, 204c mounted on a pad 212 to generate and receive critically refracted compressional and shear waves along the formation wall, and to allow measuring formation compressional and shear velocity and detection of fractures.

The multiple transmitters 206a, 206b, 206c may use delayed firing to focus and steer beams at a fluid-formation interface 205 at various effective angles of incidence (e.g., in a beam sweep). To cover a wide formation velocity range, the center of the transmitting beam can be focused and steered onto either or both of a first critical angle for exciting compressional head waves and a larger second critical angle for generating shear head wave along the formation wall.

Transmitters and receivers may be implemented as acoustic transducers. The transducers may be incorporated in a pad 212 that is in direct contact or close proximity (e.g., with a thin liquid gap) to the formation wall. The pad 212 may be acoustically coupled to the formation via a thin layer of borehole fluid (e.g., mud) 210 for acoustically fast formations. For some slow formations, an elastomeric acoustic coupler (not shown) may be employed in place of the borehole fluid. Alternatively, the transmitters and receivers may maintain a sufficient fluid gap to the formation wall to minimize pad wear/damage and also allow beam focusing at the fluid-formation boundary. With a gap filled with borehole fluid, the velocity in the fluid may also affect the critical incident angles.

An acoustic isolator located between transmitter and receiver arrays will attenuate direct waves in the tool and tool-formation reflections back into transmitter and receivers. Isolators may be also used between each transmitter or between each receiver.

Conventional methods use dipole or unipole sources to excite borehole flexural waves (dispersive, its velocity approaches formation shear at low frequency) to measure shear in slow formations. Embodiments herein may include using angled dipole transmitters, or angled unipole transmitters. Tilting the transmitter angle may help increase flexural wave energy in the borehole.

An ultrasonic acoustic beam may travel from the source (e.g., a transducer) on the logging tool to the borehole wall serving as an interface between the fluid filled-borehole and the fluid saturated rock matrix of the formation. The beam may travel some distance through the fluid (e.g., mud) in the borehole, or the source may be pressed firmly against the borehole wall. At the borehole wall, the beam is refracted at the critical angle, according to Snell's Law, and travels in the rock parallel to the borehole.

The transducer may create a compressional wave through the borehole fluid, a portion of which undergoes mode conversion to create a shear wave (as well as a compressional wave) in the fluid saturated rock matrix. The shear wave is slower than the compressional, but both may be segregated and/or recorded using conventional processing. Both compressional and shear waves refract back into the borehole, the shear converting to a compressional wave, to be detected by the receivers in the logging tool.

Referring to FIG. 2B, the tool 250 may be implemented with an integrated multiple-element transmitter array 252. The array 252 may be configured with elements 256a-256f having a 9.0 mm element width, 1.0 mm kerf, and 12.5 mm standoff, operating at 100 kHz.

The transducers may be implemented as multiple-layer stacked transducers. For example, an oil-filled four-layer stack of piezoceramic transducers may be used for a single transmitter of an array. The stack may have an absorber backing and a matching layer interfacing with the front facing, which may be, for example, inconel or other corrosion resistant material. In one example, the transducer stack may be driven in a range from 80 to 200 kHz.

The transducer front face material may have a slow-compressional velocity, e.g., close to that of the pad material if in a pad housing. A low compressional velocity in the pad and the fluid (e.g., slower than the formation shear velocity) will excite both compressional and shear refraction head waves. For acoustically slow formations (shear velocity less than fluid velocity), a shear head wave may not be excited, and only compressional head wave may be measured from the refraction method.

The pad material, if used as transducer front window, may have a compressional velocity less than or close to the fluid velocity in the borehole, or less than the shear velocity in the formation. Different sections of the pad may comprise different materials to correspond to the intended measurement. The pad material may provide protection as well as acoustic matching (e.g., impedance and/or quarter-wave matching) for maximum signal output. The pad thickness in close contact (or a fluid standoff gap) may be selected to allow ultrasonic beam to be fully developed to minimize near-filed interference. Acoustic damping in the pad material may also be desired to reduce direct tool mode and well-bore reflections. Use of reinforced plastic or rubber material may be implemented.

Figure 2C:
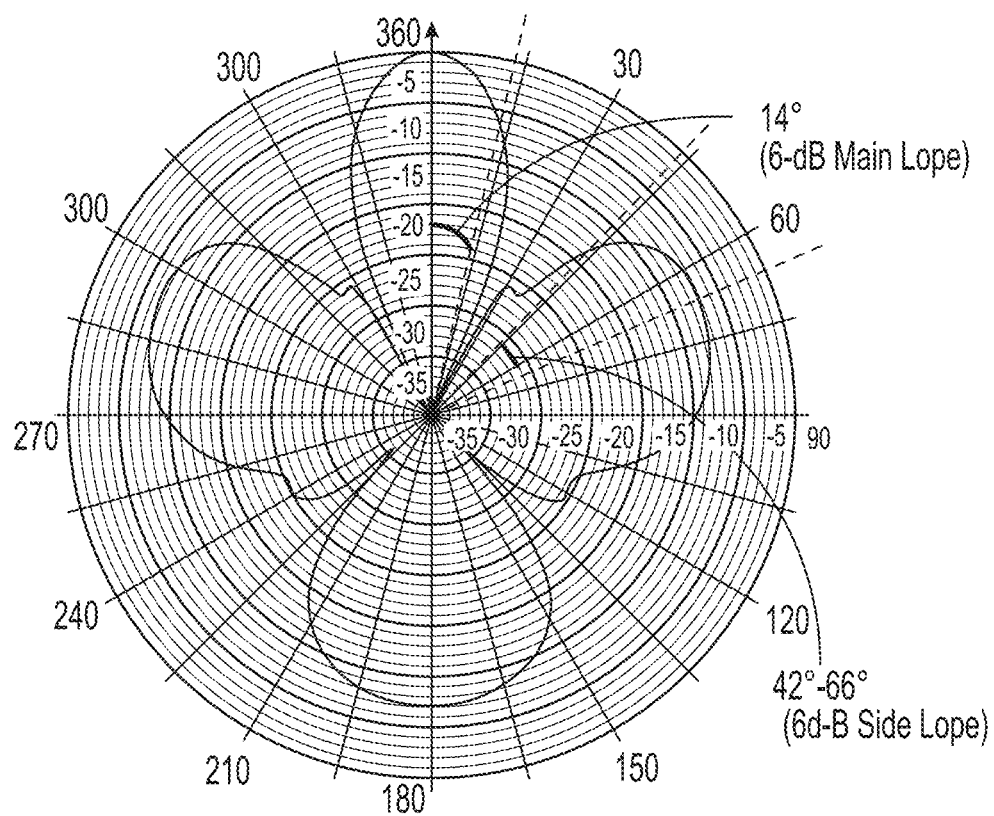
FIGS. 2C-2G show directivity of transducers in accordance with embodiments of the present disclosure.
Figure 2D:
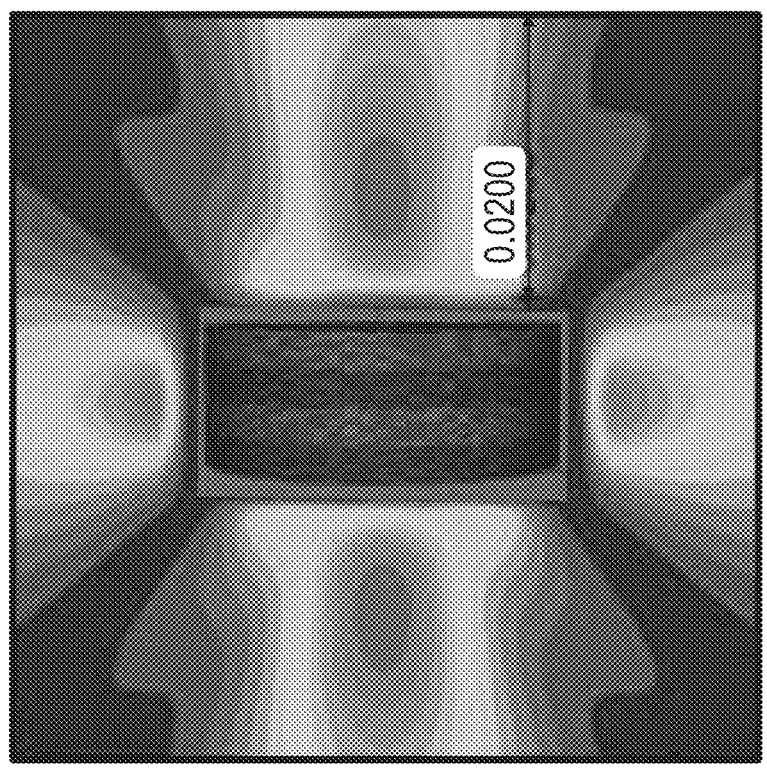
Figure 2E:
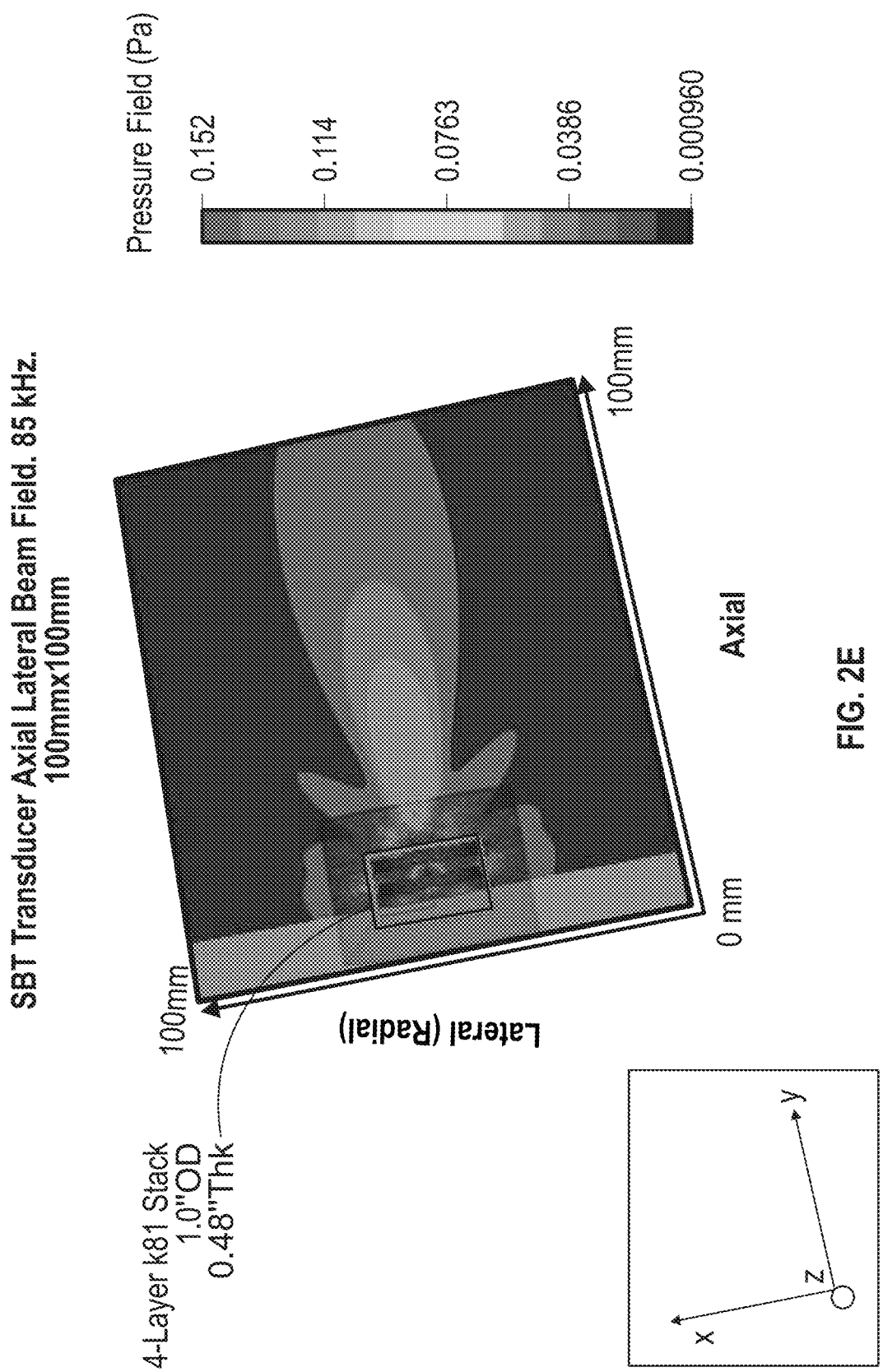
Figure 2F:
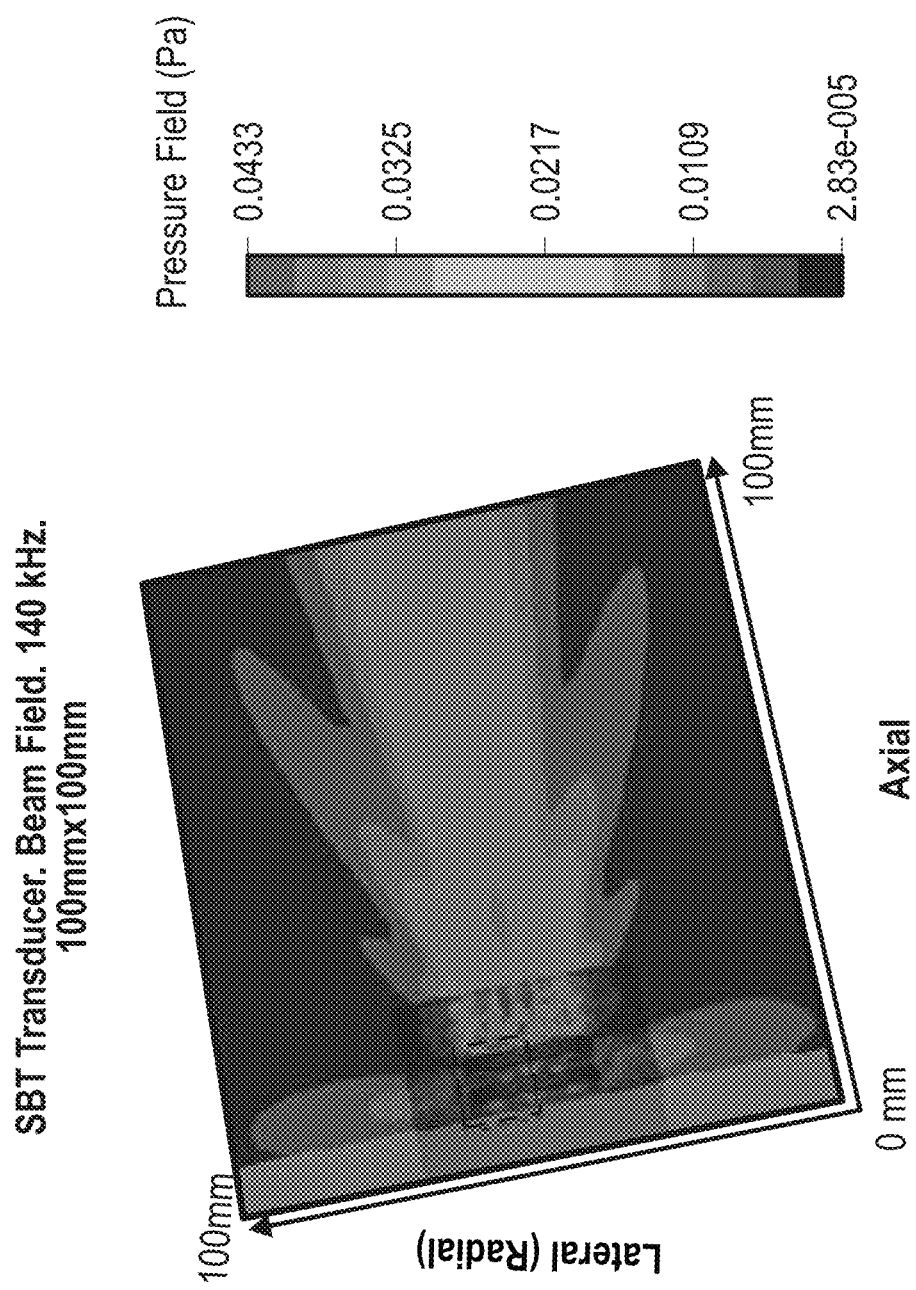
Figure 2F:
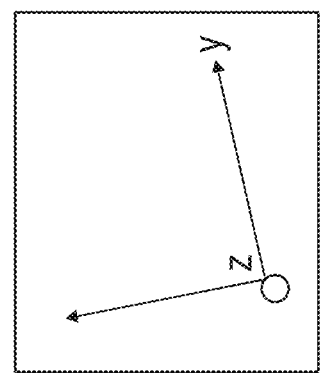
Figure 2G:
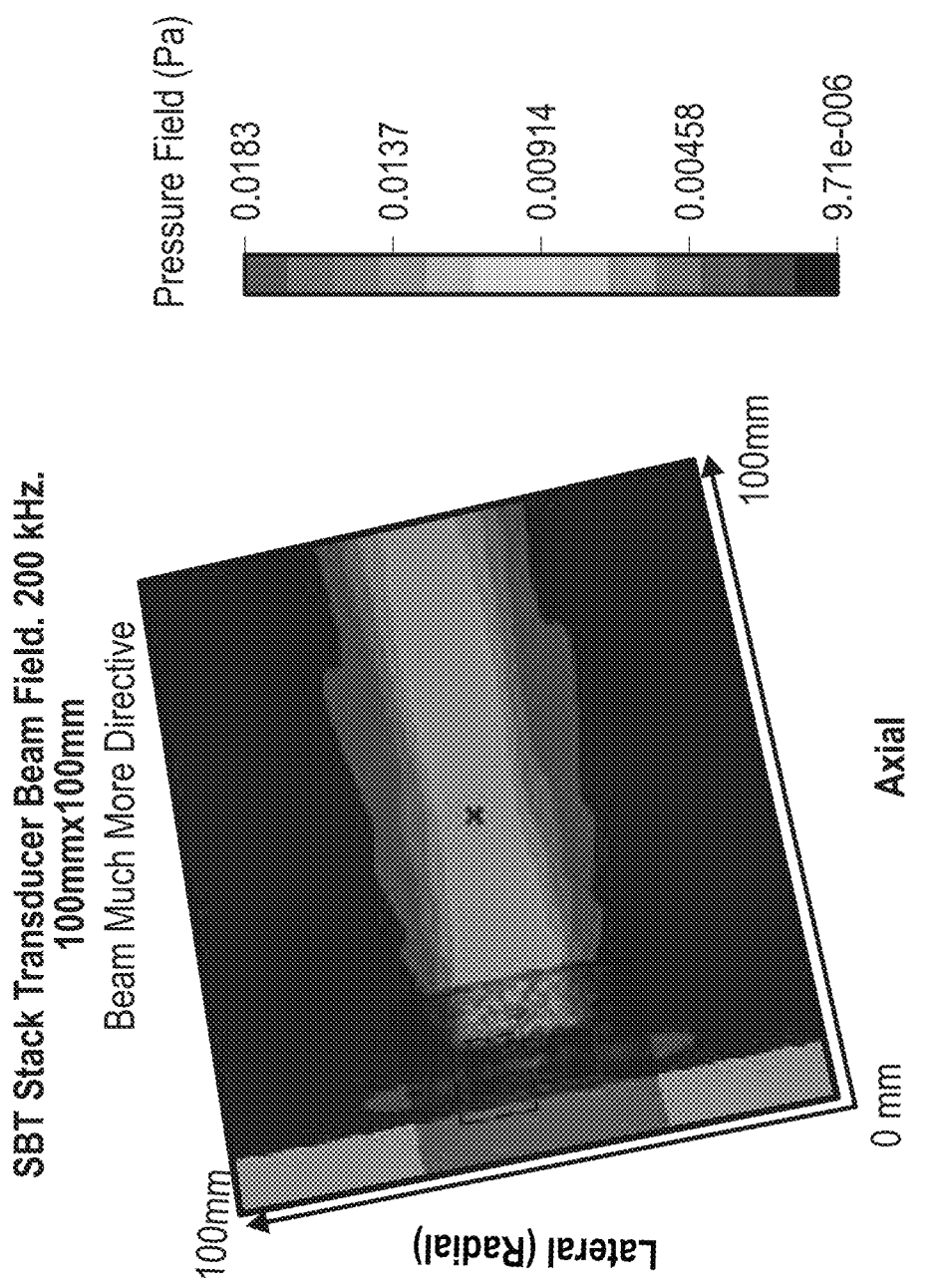
Figure 2G:
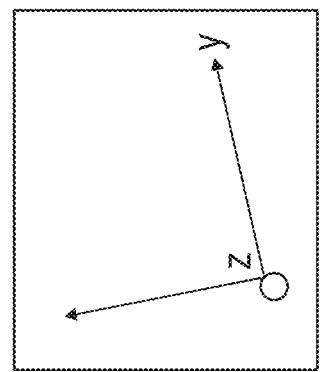

FIGS. 2C-2G show directivity of transducers in accordance with embodiments of the present disclosure. FIGS. 2C and 2D show the directivity of the stack at 80 kHz. FIG. 2E shows the directivity of the stack at 85 kHz. FIG. 2F shows the directivity of the stack at 140 kHz. FIG. 2G shows the directivity of the stack at 200 kHz.

Figure 3A:
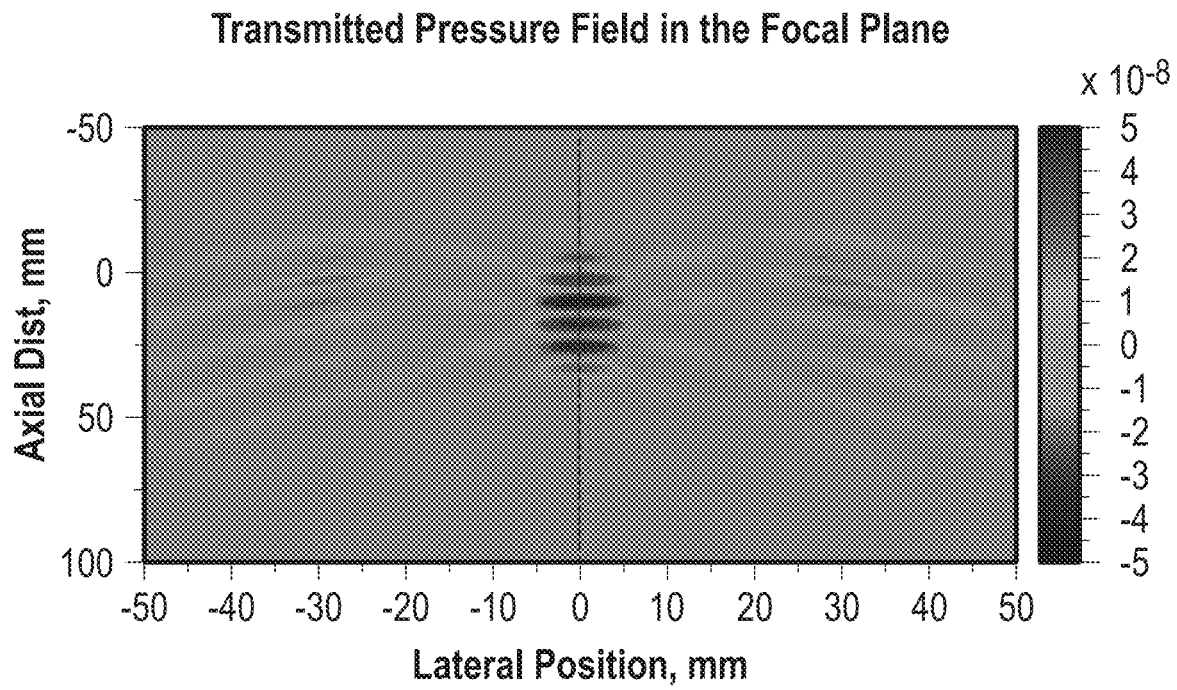
FIGS. 3A-3C show transmitting pressure fields in accordance with embodiments of the present disclosure.
Figure 3B:
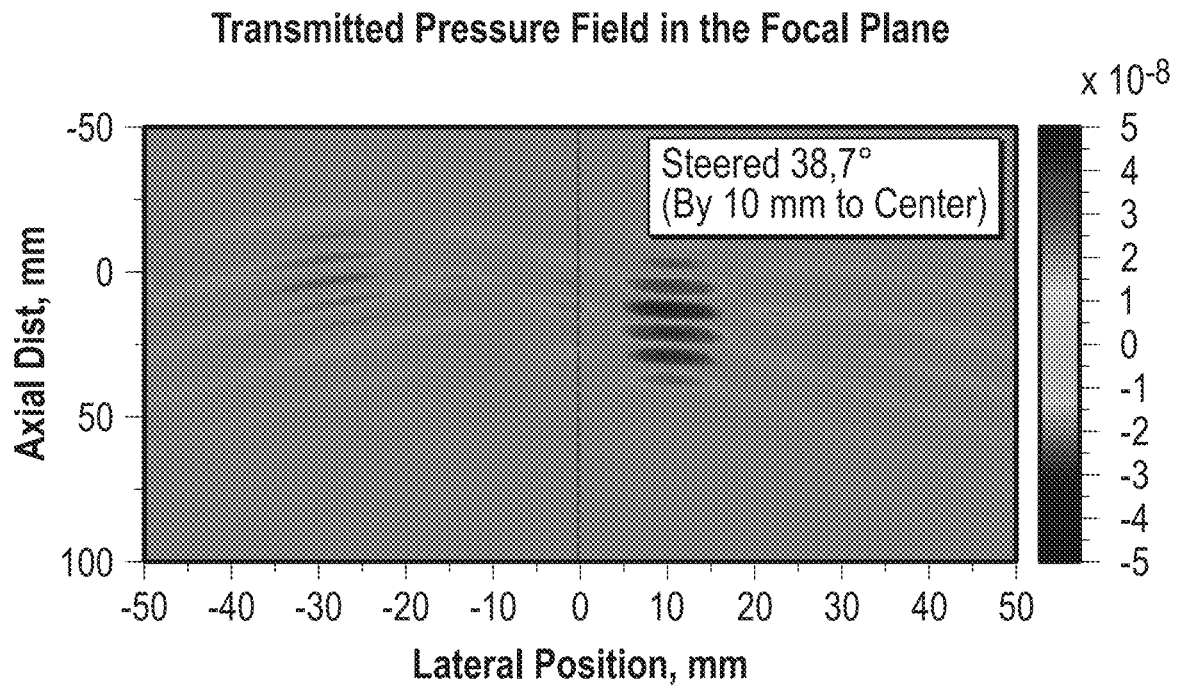
Figure 3C:
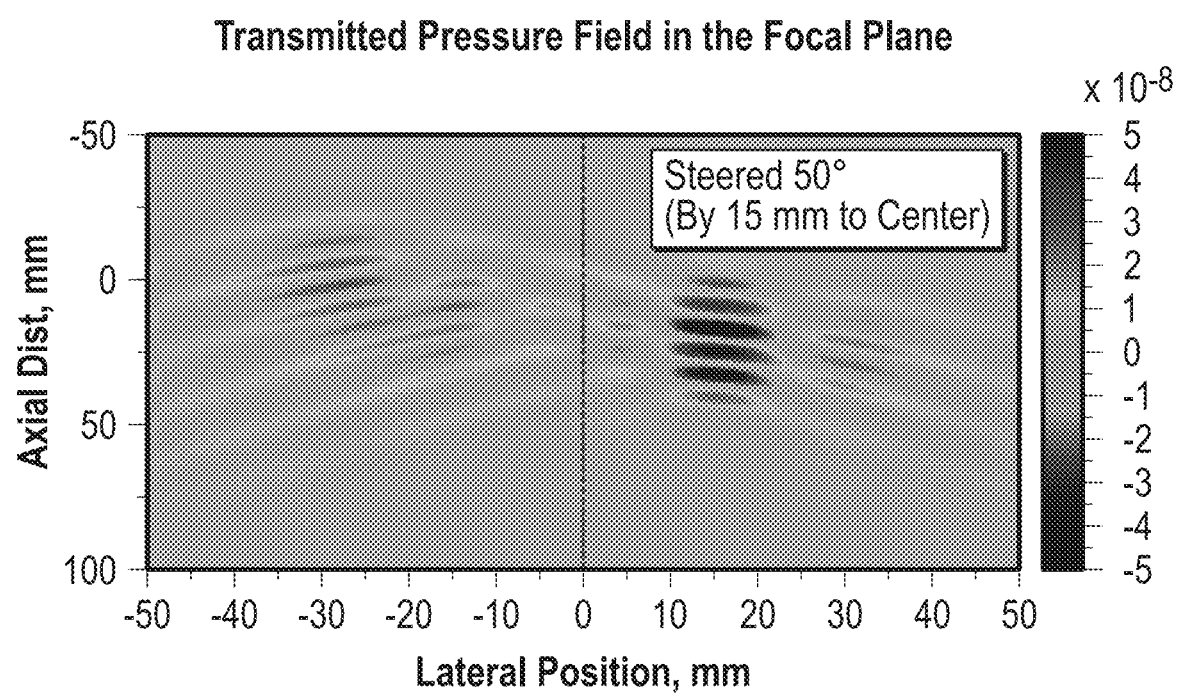

FIGS. 3A-3C show transmitting pressure fields in accordance with embodiments of the present disclosure. FIG. 3A shows a pressure field corresponding to an incident beam center focused at a 12.5-mm depth with no lateral steering. FIG. 3B shows a pressure field corresponding to an incident beam center steered by 38.7 degrees or 10 mm to the right. FIG. 3C shows a pressure field corresponding to an incident beam center steered by 50 degrees or 15.0 mm to the right. Here, the steering angle or the incident angle is the focused beam center relative to the array center vertical axis.

Figure 3D:
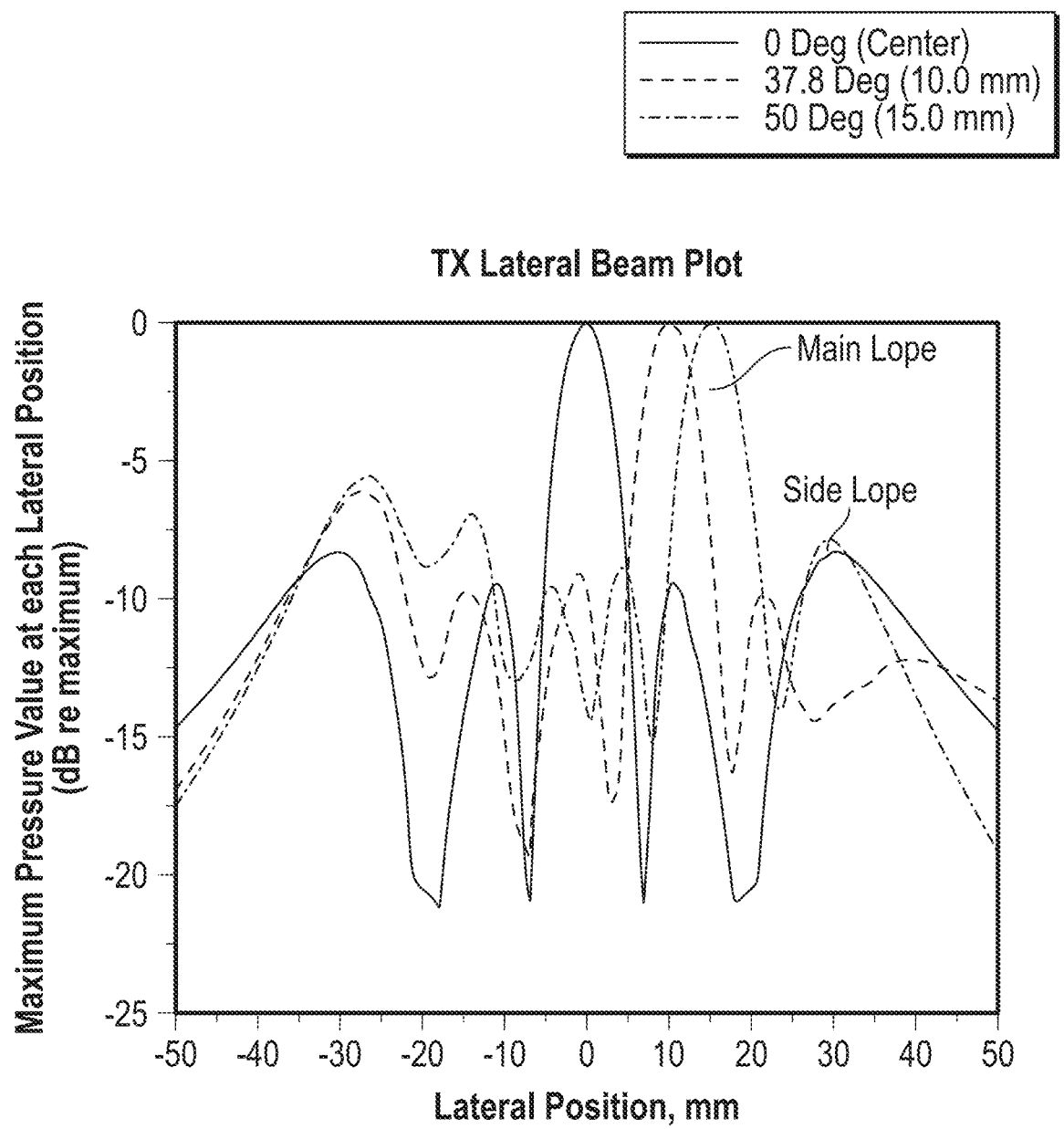
FIG. 3D shows transmitted lateral waveforms in accordance with embodiments of the present disclosure.

FIG. 3D shows transmitted lateral waveforms in accordance with embodiments of the present disclosure. FIG. 3D clearly shows the steered beams of the main lobes and to a less extent the side lobes. It is apparent that the side-lobe energy (here about 8 dB weaker than the main-lobe) may also be useful for refracted waves at wider angles. Variable depth of focusing may be used to adjust for tool-formations standoff changes and to achieve optimum incident beams. The respective acoustic beams may have different firing frequencies for exciting formation p- and s head waves for each different penetration depth.

A lateral beam steering sweep, or variable lateral steering, over a range of incident angles may be used. When used along with receiver signal detection, echo delay, and mode slowness calculation, this technique may allow optimum incident angles for maximum head wave sensitivity for a given formation. The transducer frequency may be selected from about 50-80 kHz to up about 100-150 kHz. The transmitter-receiver array spacing may be selected from about 0.50 to 1.0 feet at frequencies of 100-150 kHz, about 1 to 2 feet at 50-100 kHz, and up to about 2 to 5 feet at 20-50 kHz.

The measurements may be used to estimate various parameters of the formation, including, for example, frequency dependent velocity dispersion and attenuation, porosity, fluid saturation, fracture location, fracture orientation, Poisson's ratio, Young's modulus, bulk modulus, shear modulus, and so on.

Techniques as disclosed herein lend themselves to various embodiments. As described above some embodiments may employ an array of transmitter elements for incident beam focusing and steering. Other embodiments in accordance with the present disclosure may employ a sensor-on-pad variant using at least two oblique-angled transmitters and at least two oblique-angled receivers.

Figure 4A:
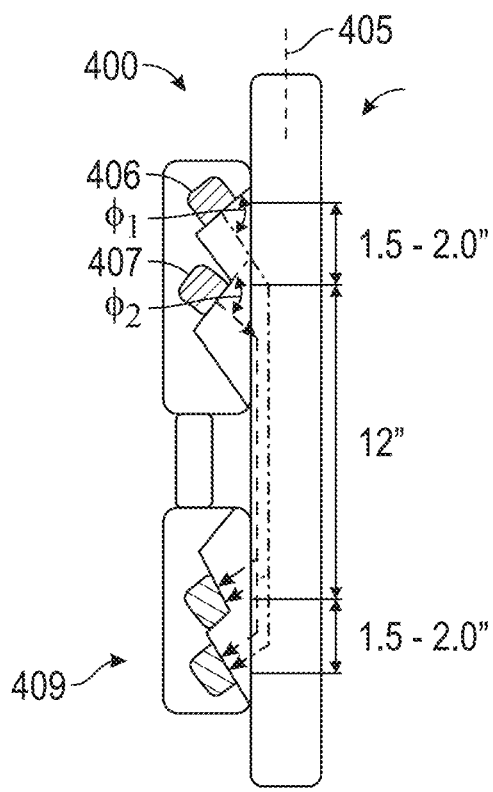
FIGS. 4A-4D illustrate schematic views of tools in accordance with embodiments of the present disclosure.

FIGS. 4A-4D illustrate schematic views of tools in accordance with embodiments of the present disclosure. FIG. 4A shows a tool 400 comprising a plurality of oblique angled transmitters 406 having the same tilt angle φ with respect to the longitudinal axis 405 of the tool (as well as the pad face). That is, the tilt angle $\varphi_1$ of a first transmitter of the plurality is the same as a second tilt angle $\varphi_2$ of a second transmitter. Both transmitter and receivers may be close to or above the desired critical angle. Delay firing may be used to steer the excitation beam at a desired incidental angel for critical refraction wave generation. A pair of receivers 409 generate signals responsive to detection of the resulting waveforms.

Figure 4B:
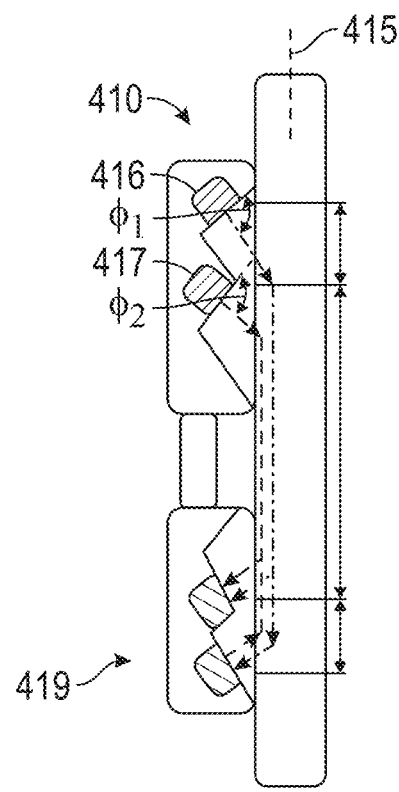

FIG. 4B shows a tool 410 comprising a plurality of oblique angled transmitters 416 having different tilt angles with respect to the longitudinal axis of the tool (as well as the pad face). That is, the tilt angle $\varphi_1$ of a first transmitter of the plurality is different than a second tilt angle $\varphi_2$ of a second transmitter. Different tilt angles may be used in the transmitter and receivers. As an example, a wider incident angle from the far transmitter may be used for a shear head wave while a smaller incident angle from the near transmitter may be used for P-wave generation. A pair of receivers 419 generate signals responsive to detection of the resulting waveforms.

Figure 4C:
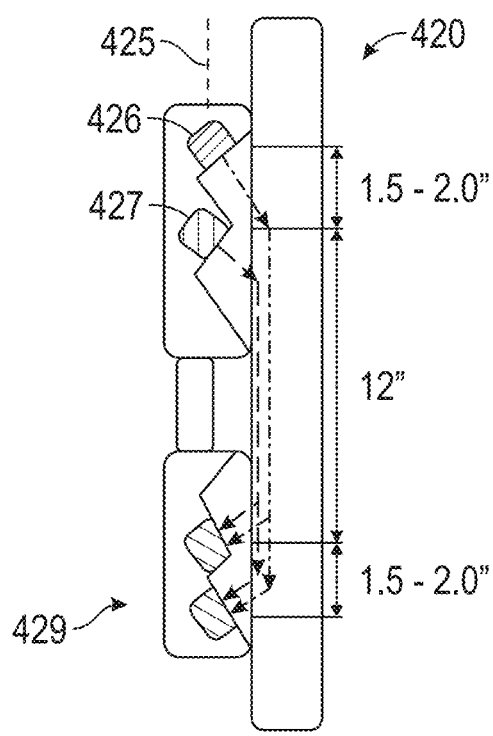

FIG. 4C shows a tool 420 comprising a plurality of oblique angled transmitters 426 having the same tilt angle φ with respect to the longitudinal axis 425 of the tool (as well as the pad face), but using multiple frequencies. That is, a higher frequency may be used for the near transmitter 427 and a lower frequency for the far transmitter 426. Varying frequencies allows measurement at different penetration depths into the formation. For example, at 100 kHz, acoustic penetration may be about 1.25 inches at formation compressional values of approximately 3200 m/s. A pair of receivers 429 generates signals responsive to detection of the resulting waveforms.

Figure 4D:
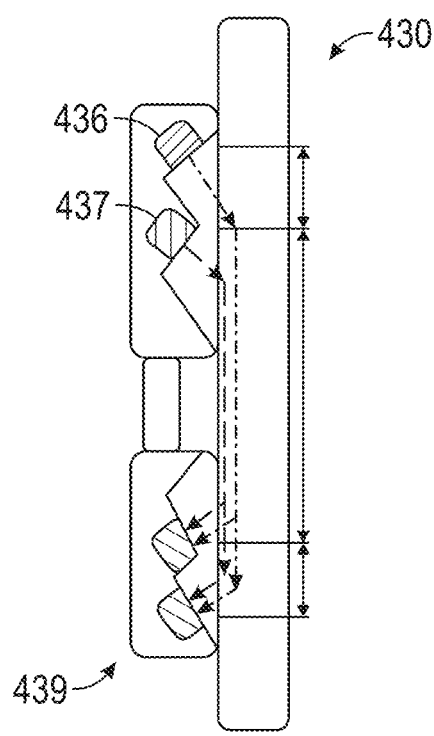

FIG. 4D shows a tool 430 comprising a plurality of oblique angled transmitters 436 having different tilt angles with respect to the longitudinal axis of the tool (as well as the pad face). That is, the tilt angle $\varphi_1$ of a first transmitter of the plurality is different than a second tilt angle $\varphi_2$ of a second transmitter. Different tilt angles may be used in the transmitter and receivers. Tool 430 uses multiple frequencies and multiple incidental angles to selectively excite dominant compressional and shear head waves along the formation wall. A pair of receivers 439 generate signals responsive to detection of the resulting waveforms.

Figure 5A:
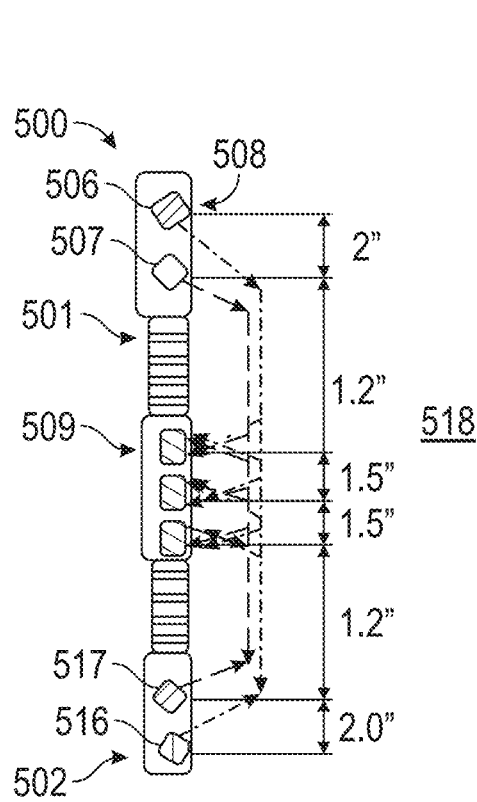
FIGS. 5A & 5B illustrate schematic views of tools having symmetrically placed transmitter arrays placed above and below the receiver array for compensated measurement in accordance with embodiments of the present disclosure.
Figure 5B:
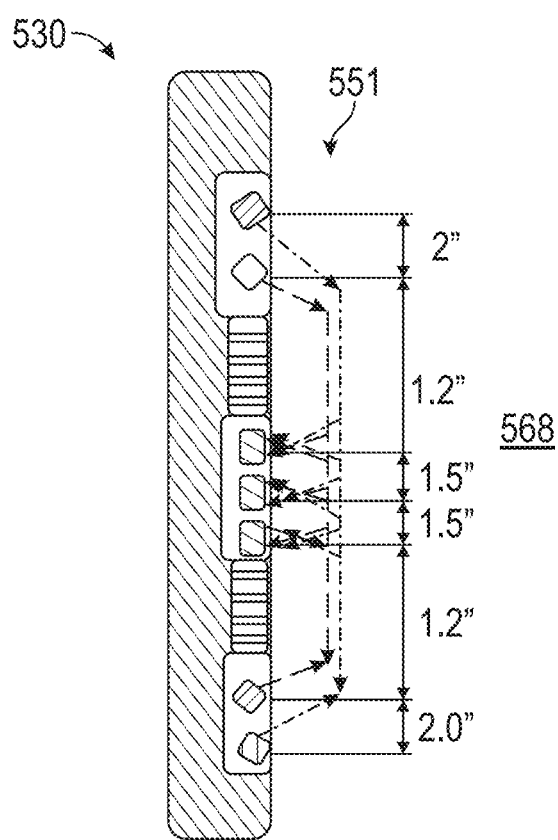

FIGS. 5A & 5B illustrate schematic views of tools having symmetrically placed transmitter arrays 501, 502 placed above and below the receiver array for compensated measurement in accordance with embodiments of the present disclosure. FIG. 5A shows a tool 500 comprising a plurality of oblique angled transmitters 506 and 507 in the first array 501 above the tool, and a plurality of oblique angled transmitters 516 and 517 in the second array 502 below the tool. The transmitters and the receiver array are incorporated in one or more pads 508. The receivers of the receiver array 509 may be substantially untilted, e.g., untilted with respect to the tool axis.

The pad face 508 of the tool 500 is engaged with the borehole wall. For a relatively smooth wellbore, a tight pad-formation standoff contact may improve signal transmission without much attenuation in well fluid. The contact pad method may be employed, for example, in wireline tools using one or more sensor pads in contact with the formation wall and supported by one or more arms extendable from a main tool body via actuators.

The individual transmitters 506, 507, 516, and 517 in each transmitter array may be at the same or at different incidence angles and/or different frequencies to each other. Receiver transducers of the receiver array 509 may be configured for broadband frequency response, and have a wide angle of directivity. The symmetrical placement method may compensate for borehole rugosity and transducer sensitivity variations, and thus result in more accurate formation velocity and attenuation measurements. The spacing between the top transmitter array to the receiver array, and between the lower transmitter array to the receiver array may be different, e.g., a longer T-R spacing may be used with a lower frequency for wide shear signal separation (shear wave velocity measurement), while a shorter T-R spacing with a higher frequency may be employed for measurements relating to compressional velocity.

FIG. 5B illustrates a tool having symmetrically placed transmitter arrays configured for use at a standoff from the borehole wall. For example, an angled transducer array may be mounted at a recess on a logging tool body with a fluid gap 501 in the annulus between the tool 550 and the formation wall 568. As one example, the tool may be a wireline or logging-while-drilling (LWD) tool that may be centralized in the borehole.

Referring to FIG. 5B, the compensated transducer arrays may be mounted axially on the wall of a wireline tool, or on the collar or mandrel of an LWD tool. The critical incident angles for refraction wave in the formation will be affected by not only the transducer incident angle into the well fluid (e.g., drilling mud) but also the velocity contrast in the mud and in the formation. That is, for a formation velocity measurement, a high velocity in the mud would require a higher incidental angle in order to excite formation compressional and shear head waves. Generating an angled beam or a focused beam onto the formation at angles around the critical angles (i.e., first critical angle of compressional measurements, and the second critical angle of shear measurements) concentrates acoustic energy and may excite formation refraction waves much more efficiently as compared to using normal-angled or omnidirectional transducers, where a majority of acoustic energy is lost from reflection (and transmitted into the formation) and never received. Using a sweep of a focused and steered transmitting beam by varying the incident angle over a range of angles may allow estimation of an optimum critical angle maximizing head wave signals for a given formation. Varying the incident angle with a slowness measurement feedback control loop may result in a faster estimation of the critical angle with increased granularity. Frequency may also be varied with each incident angle over a range of angles or by using frequency choice algorithms or lookup tables. Using a wide incident angle sweep may also impart a wider dynamic range and better sensitivity for head wave measurement in various different formations.

As discussed above, in various design embodiments the pad tool may be placed along the axial direction of the borehole. This placement will provide measurement coverage along an axial strip for a single pad while the tool is moving axially (e.g., in wireline tool). Use of multiple angle-offset pads will increase the borehole coverage area. However, obtaining 100% azimuthal coverage and some additional overlapping may be problematic with some wireline embodiments if the sensor is not configured for rotation.

Figure 6A:
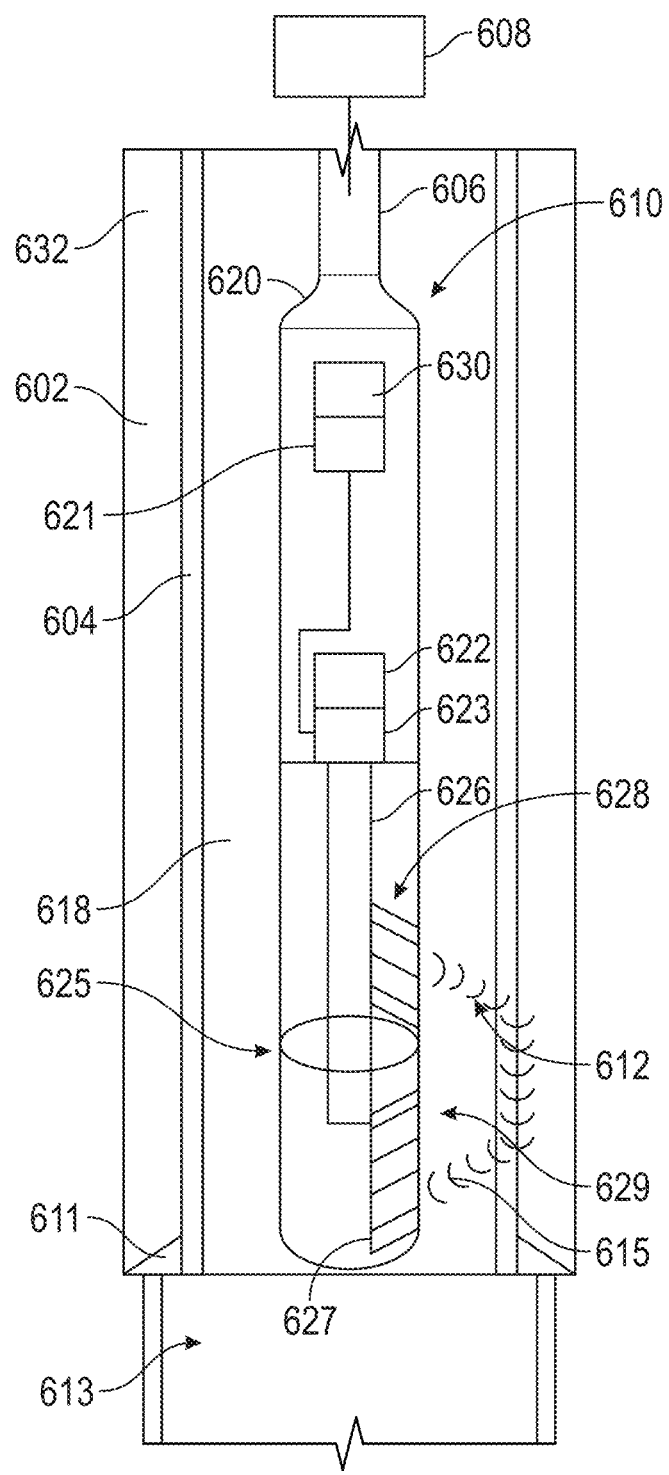
FIGS. 6A-6C illustrate tools configured for azimuthal measurements in accordance with embodiments of the present disclosure.
Figure 6B:
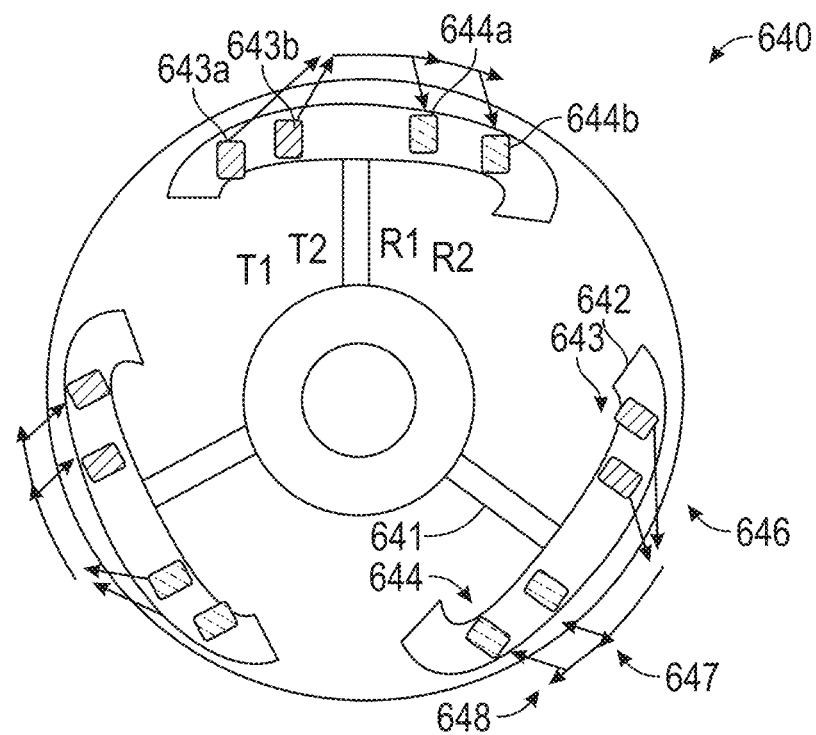
Figure 6C:
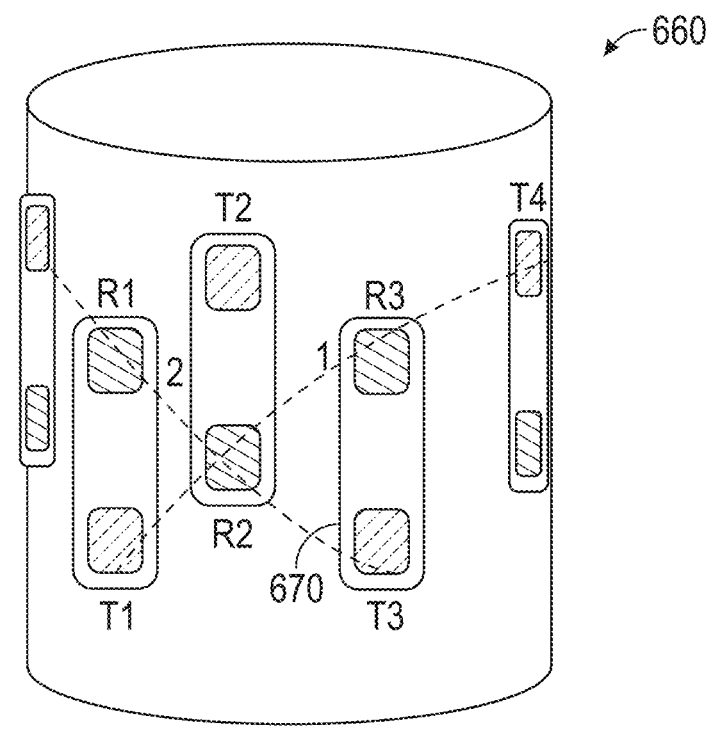

FIGS. 6A-6C illustrate tools configured for azimuthal measurements in accordance with embodiments of the present disclosure. An azimuthal rotation sub may be obtained with a cable- or battery-powered motor assembly built in the logging tool sub or use existing conventionally configured tool rotation. Multiple axial sensor arrays around the subs may be used to provide overlapping sensing areas and increase detection resolution and speed.

FIG. 6A shows a tool with a rotating acoustic assembly for azimuthal measurement. The tool 610 may be connected to one end of a cable 606 and may comprise a housing 620 which contains acoustic assembly 625 on a mount 626 rotated by an electric motor 622. The acoustic assembly 625 may include a transmitter 624 as well as a receiver 627, each of which may be implemented as a transducer, set of transducers, or phase array module. Rotation of the acoustic assembly 625 may enable evaluation of substantially all the circumference of the borehole 602 (e.g. behind casing 604) by steering an acoustic beam 612 to an interface and receiving an acoustic signal 615 at various angular positions around the axis of the borehole 602. The acoustic signal 615 is received by receiver 627. The piezoelectric elements 628 making up the transmitter 624 may emit the ultrasonic acoustic beams upon being energized by electrical impulses from transceiver circuitry 621. The electrical impulses are conducted through an electromagnetic coupling 623. After transmitting, the transceiver circuit 621 is configured to receive a time-varying electrical voltage generated by the piezoelectric elements 629 of the receiver 627 as a result of the acoustic signal 615 striking the piezoelectric elements 629. The tool 610 may also comprise additional processors 630 configured to conduct measurements with the tool 610 and transmit information to the surface logging unit 608 through the cable 606.

An alternative azimuthal coverage measurement method is to use transducer arrays on the circumference of a logging tool. FIG. 6B illustrates a tool 640 having azimuthally distributed acoustic assemblies 650 in accordance with embodiments of the present disclosure. For wireline measurement, multiple pads 642 on the distal end of multiple arms 641 at angular and axial offsets may be used to achieve azimuthal full coverage. Each pad 642 may include circumferentially arrayed transmitters 643a, 643b (collectively 643) and receivers 644a, 644b (collectively 644).

For an azimuthal measurement, the acoustic waves 646 may be excited by angle-beamed transmitters, and transmitted onto a fluid-formation interface at different critical angles. The refracted compressional and/or shear waves 647 may be generated and propagated around the circumference of the formation and detected from the resulting acoustic signals 648 by receiver transducers 644 on the pad(s). Note that transmitter and receiver arrays may also be built onto a single pad.

FIG. 6C illustrates a tool 660 having helically distributed acoustic assemblies 670 in accordance with embodiments of the present disclosure. In addition to the above axial and circumferential placement and coverage methods, further embodiments use transducers placed along a helical path on a logging tool for open-hole formation velocity measurements. Transmission from a first transmitter (T1) may be received and compared at R2 and R3. A similar transmission from T4 may be received at R3 and R2 and compared between the receivers as well as with the original results from T1. As one example, measurements may be used to conduct cased-hole cement bond evaluation.

Figure 7A:
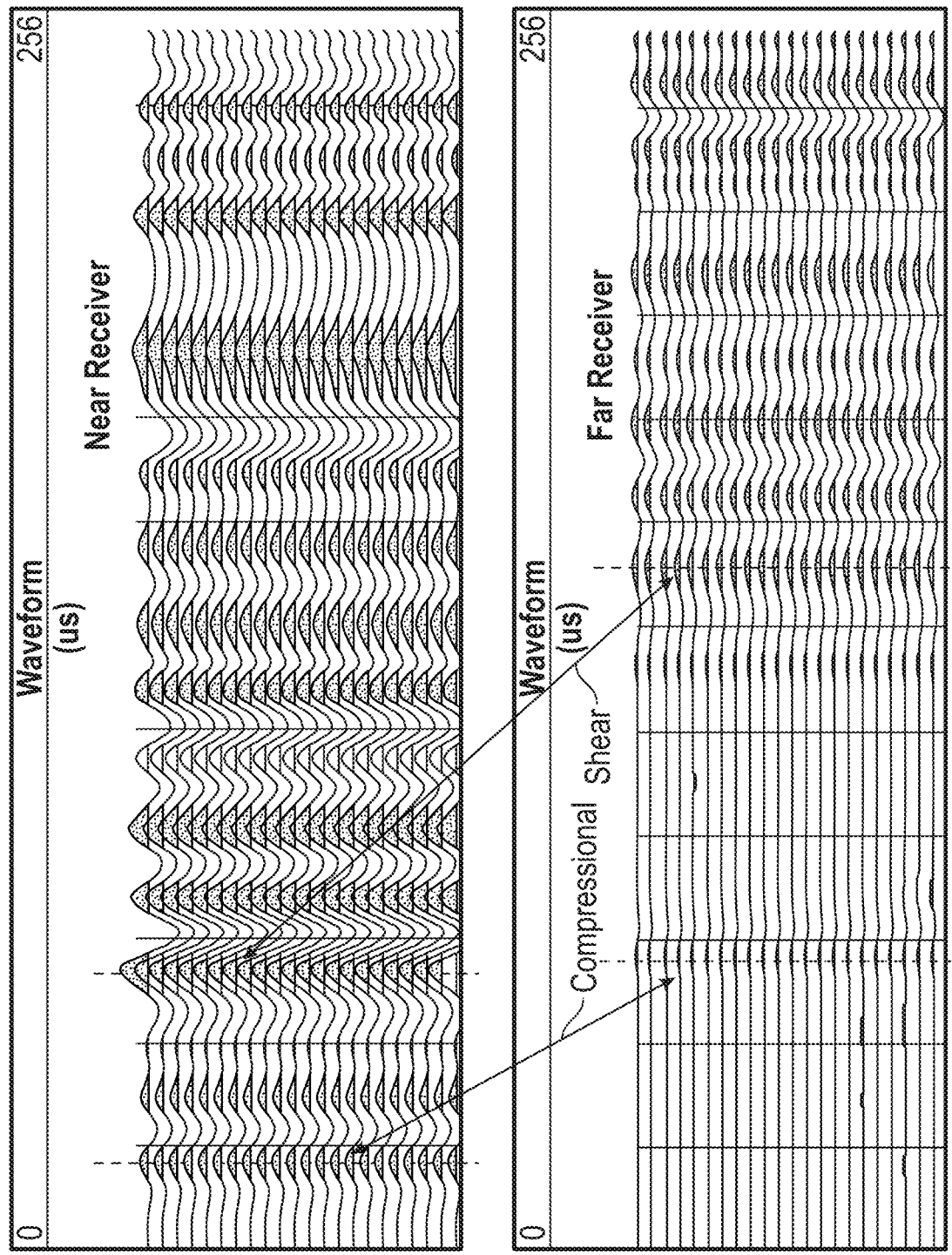
FIGS. 7A &7B illustrate compressional and shear wave data in accordance with embodiments of the present disclosure.
Figure 7B:
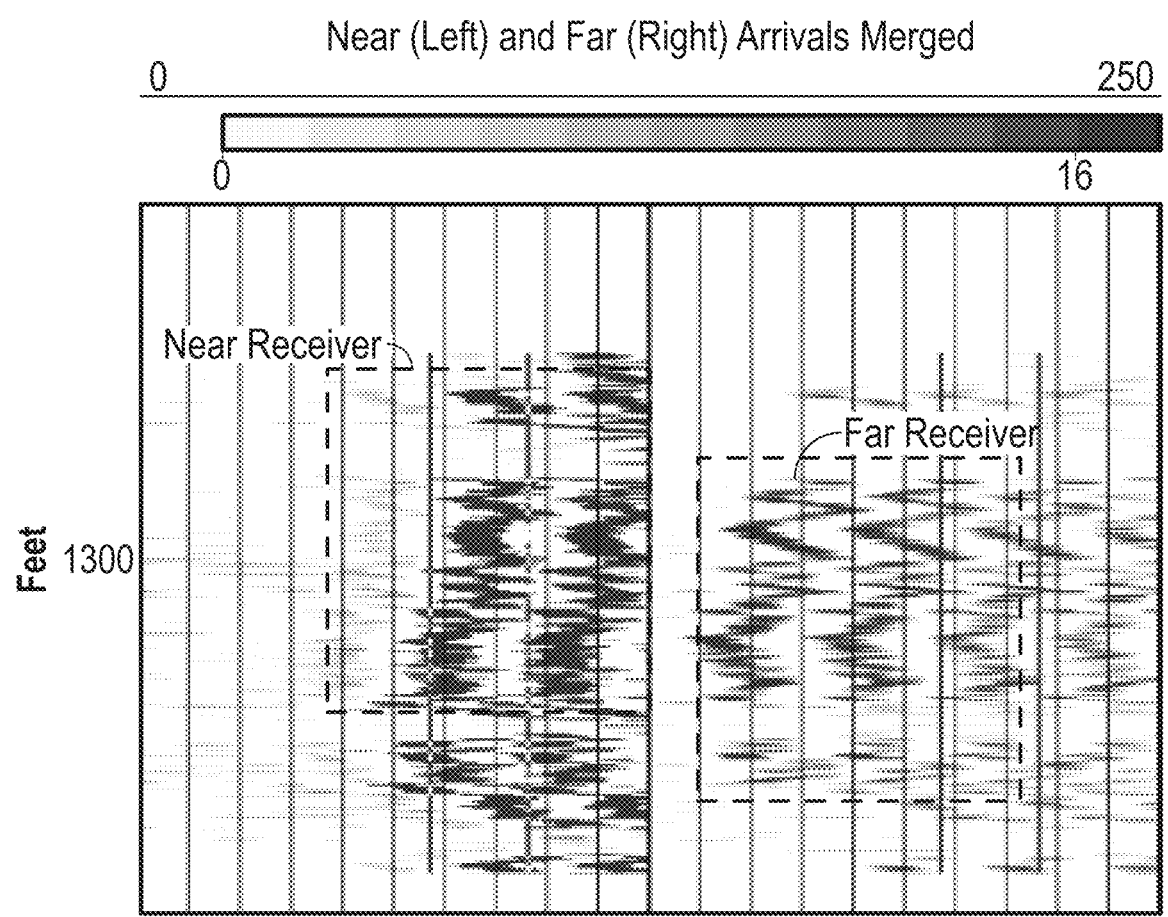

FIGS. 7A & 7B illustrate compressional and shear wave data in accordance with embodiments of the present disclosure. FIG. 7A illustrates compressional and shear formation arrivals from helical path configurations from a stationary tool in accordance with embodiments of the present disclosure. FIG. 7B illustrates near and far waveforms from helical path configurations. The near and far receiver waveforms show arrivals and delay of formation compressional and shear waves propagated helically (i.e., through a helical path) on the wellbore wall.

Although the focus of the disclosure is use of angled or angled-beamed transducers on a logging tool, applications employing transducers at normal incident angle to generate and receive critical refracted formation head waves, using the energy from transmitter's main-lope or side-lope, or using an angled wedge or coupler, are also foreseen.

Figure 8B:
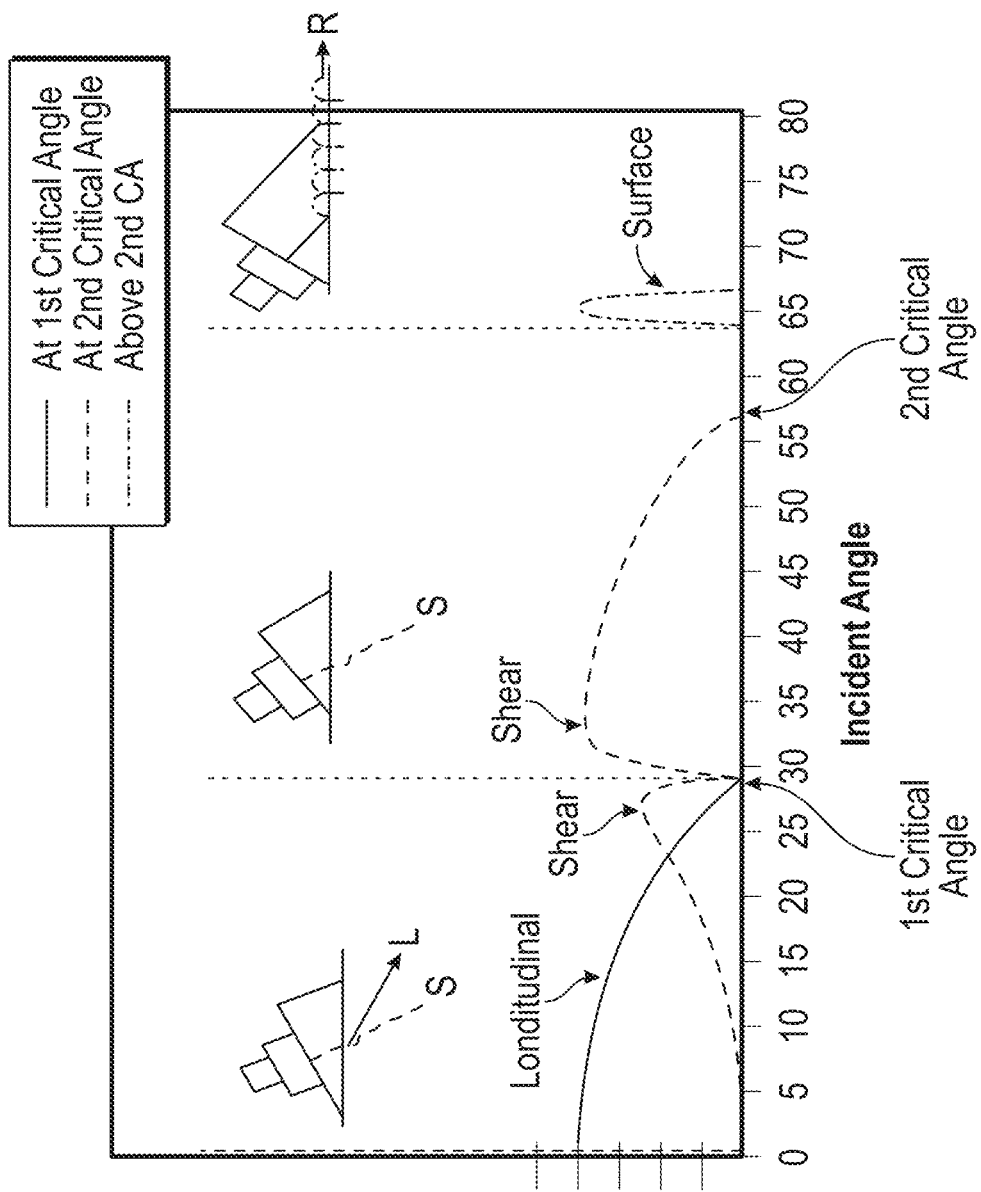
FIGS. 8A and 8B illustrate conditions for refraction waves in accordance with embodiments of the present disclosure.
Figure 8A:
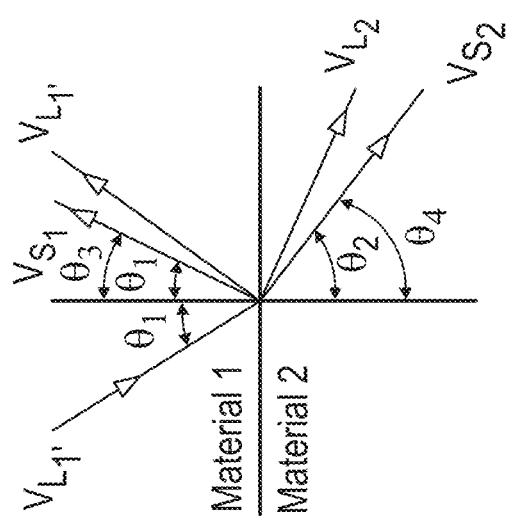

FIGS. 8A and 8B illustrate conditions for refraction waves in accordance with embodiments of the present disclosure. FIG. 8A shows oblique reflection and transmission at various angles of incidence with the interface between a first material and a second material for the shear velocity Vs and the compressional (or longitudinal) velocity $V_L$ in accordance with embodiments of the present disclosure. FIG. 8A illustrates Snell's law, which determines the effective "path" that acoustic energy takes when moving from one medium to another. Accordingly, $$\sin \theta_1 / V_{L1} = \sin \theta_2 / V_{L2} = \sin \theta_3 / V_{S1} = \sin \theta_4 / V_{S2}$$

The critical angle is the effective angle of incidence that creates refraction of acoustic energy along the interface between two dissimilar media.

FIG. 8B shows critically refracted longitudinal and shear waves in accordance with the present disclosure. At a first critical angle, a refracted P-wave is excited along a fluid-solid interface, and at the first critical angle the shear wave is mode converted into the solid. At the second critical angle, a refracted shear wave is generated along the fluid-solid interface, but not a P-wave. Above the second critical angle, only a surface wave (e.g., a Rayleigh wave) is generated.

Figures 9A, 9B:
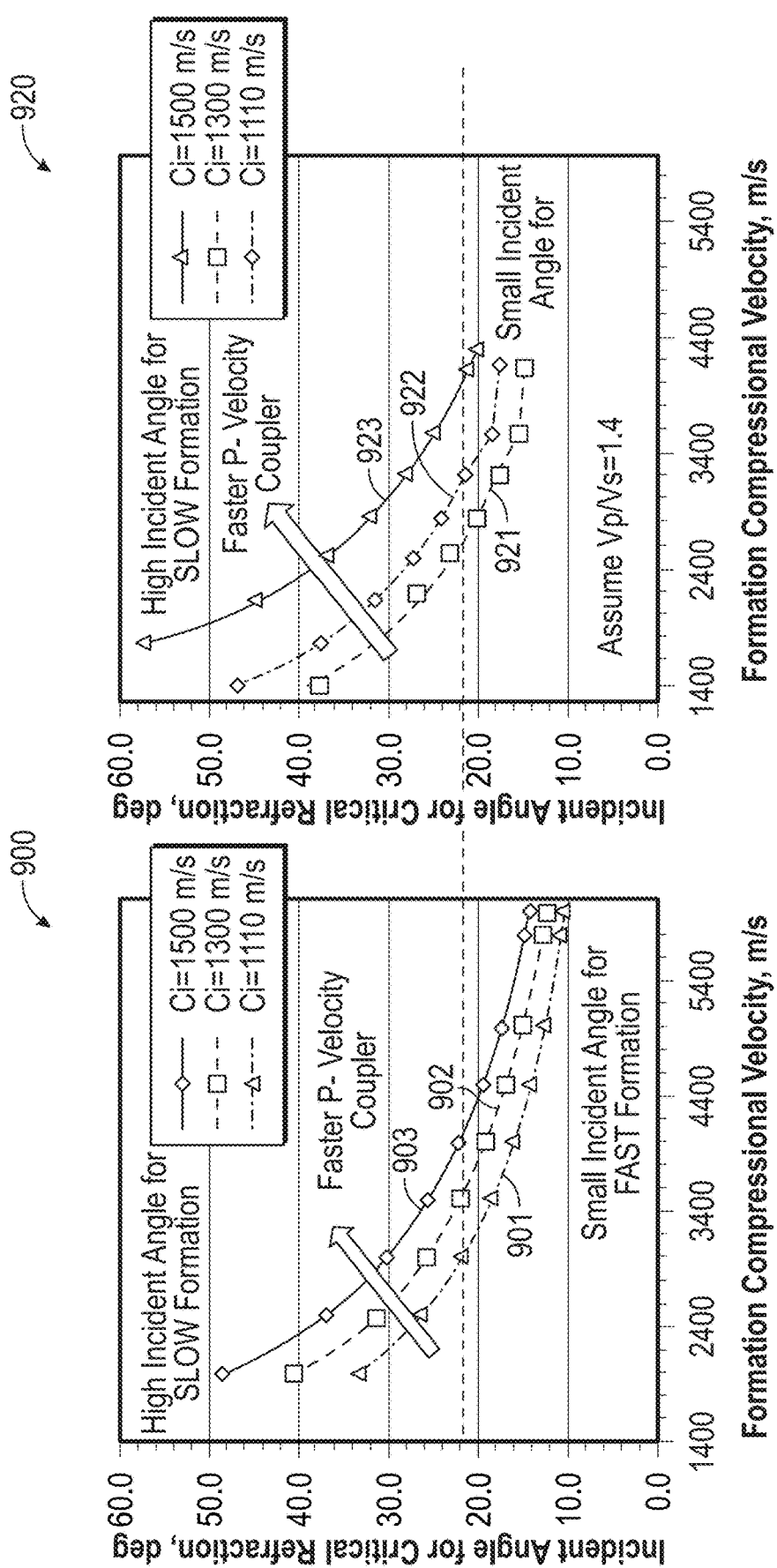
FIGS. 9A and 9B illustrate incident angles at the medium-formation boundary for generating critically refracted compressional and shear waves in accordance with embodiments of the present disclosure.

FIGS. 9A and 9B illustrate incident angles at the medium-formation boundary for generating critically refracted compressional and shear waves in accordance with embodiments of the present disclosure. FIG. 9A shows incident angle with respect to formation compressional velocity value for various incident coupler compressional velocity values. The coupler compressional velocity values include 1100 meters per second 901, 1300 meters per second 902, 1500 meters per second 903. FIG. 9B shows incident angle with respect to formation shear velocity value for various incident coupler compressional velocity values. The coupler compressional velocity values include 1100 meters per second 921, 1300 meters per second 922, 1500 meters per second 923. It is apparent that fast formations require relatively smaller incident angles than slow formations, and refraction shear waves require a relatively larger incident angle than compressional. Also, the incidence angle required for both compressional and shear waves decreases with decreases in coupler velocity.

Figure 10:
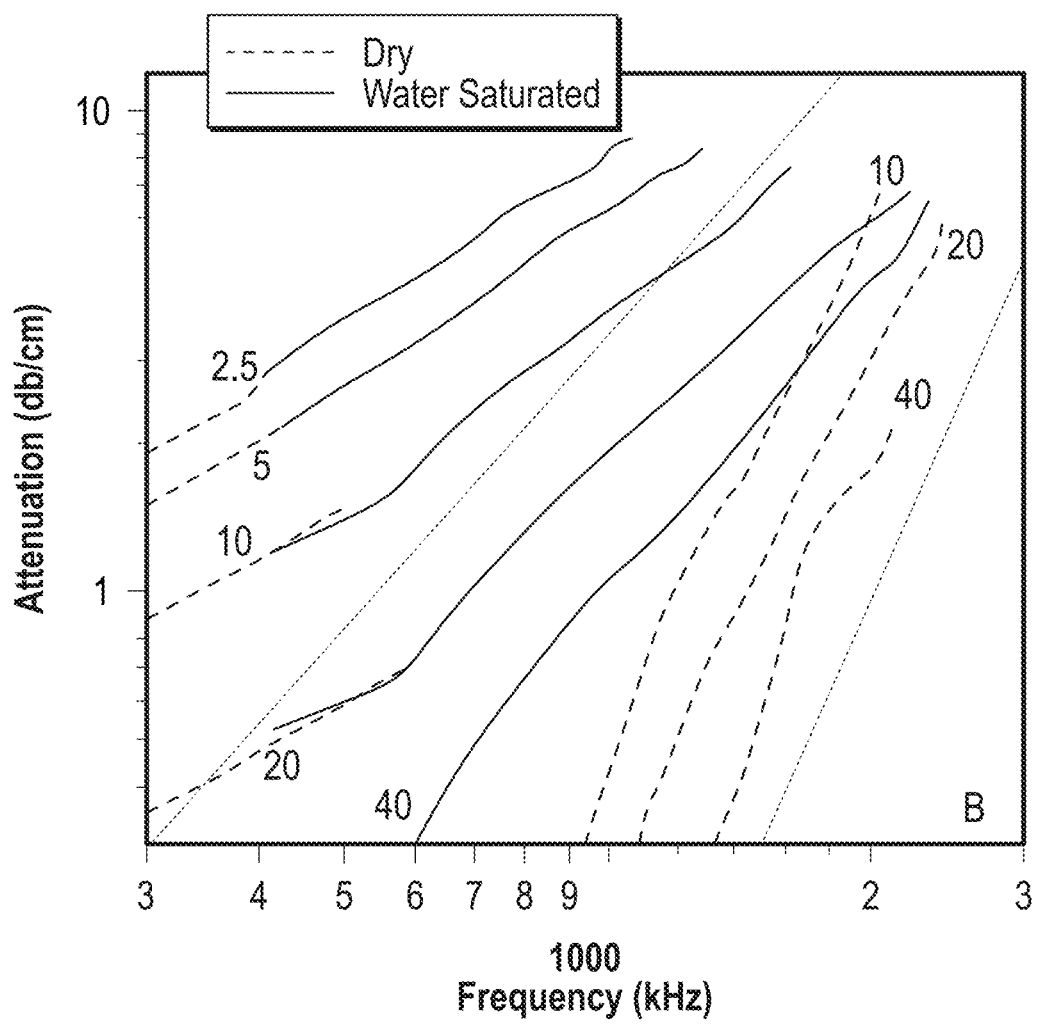
FIG. 10 illustrates ultrasonic compressional wave attenuation with respect to frequency.

FIG. 10 illustrates ultrasonic compressional wave attenuation with respect to frequency. FIG. 10 illustrates the relationship of ultrasonic compressional wave attenuation and frequency in Berea Sandstone. Attenuation may be estimated as 1.0 dB per centimeter at 100 kHz.

Figure 11A:
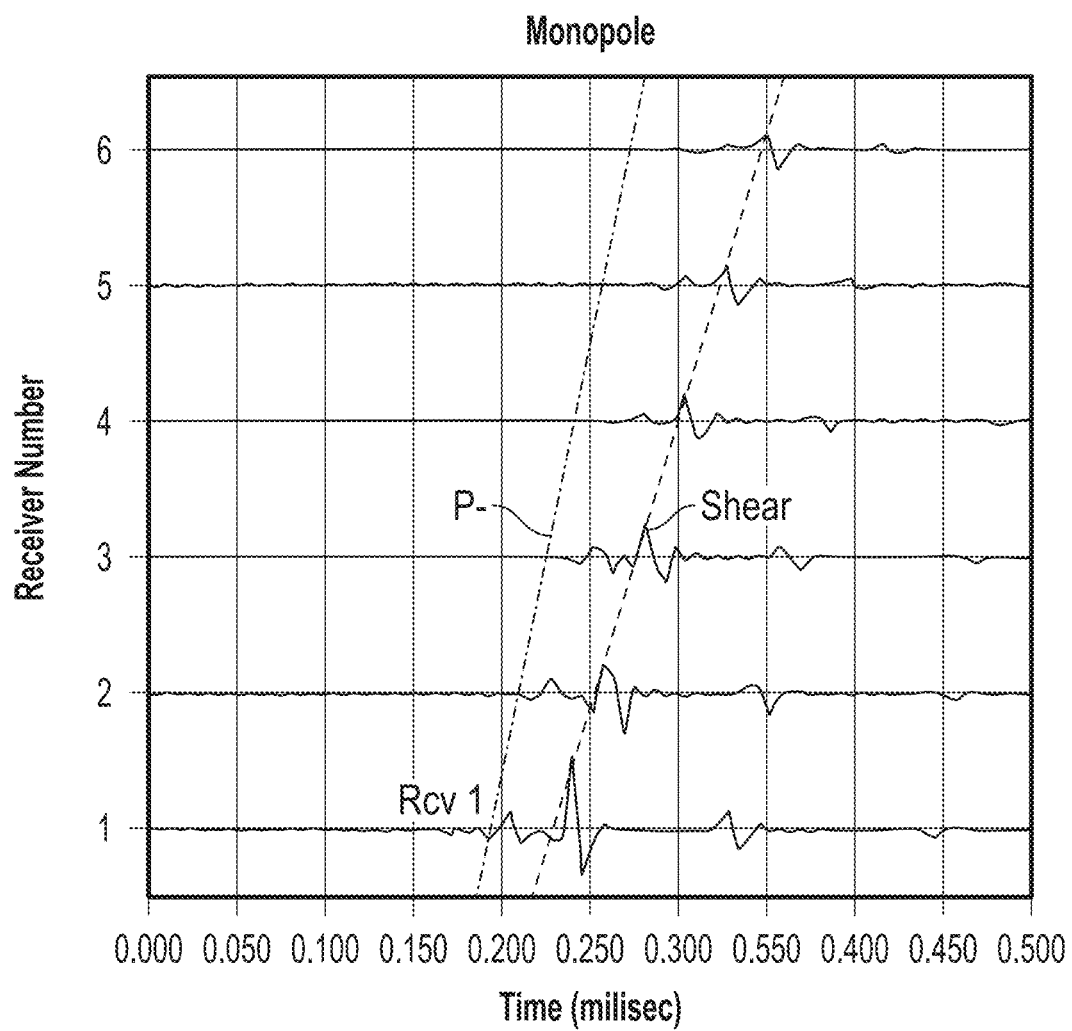
FIGS. 11A and 11B illustrate simulated critically refracted compressional and shear waves excited in accordance with embodiments of the present disclosure.
Figure 11B:
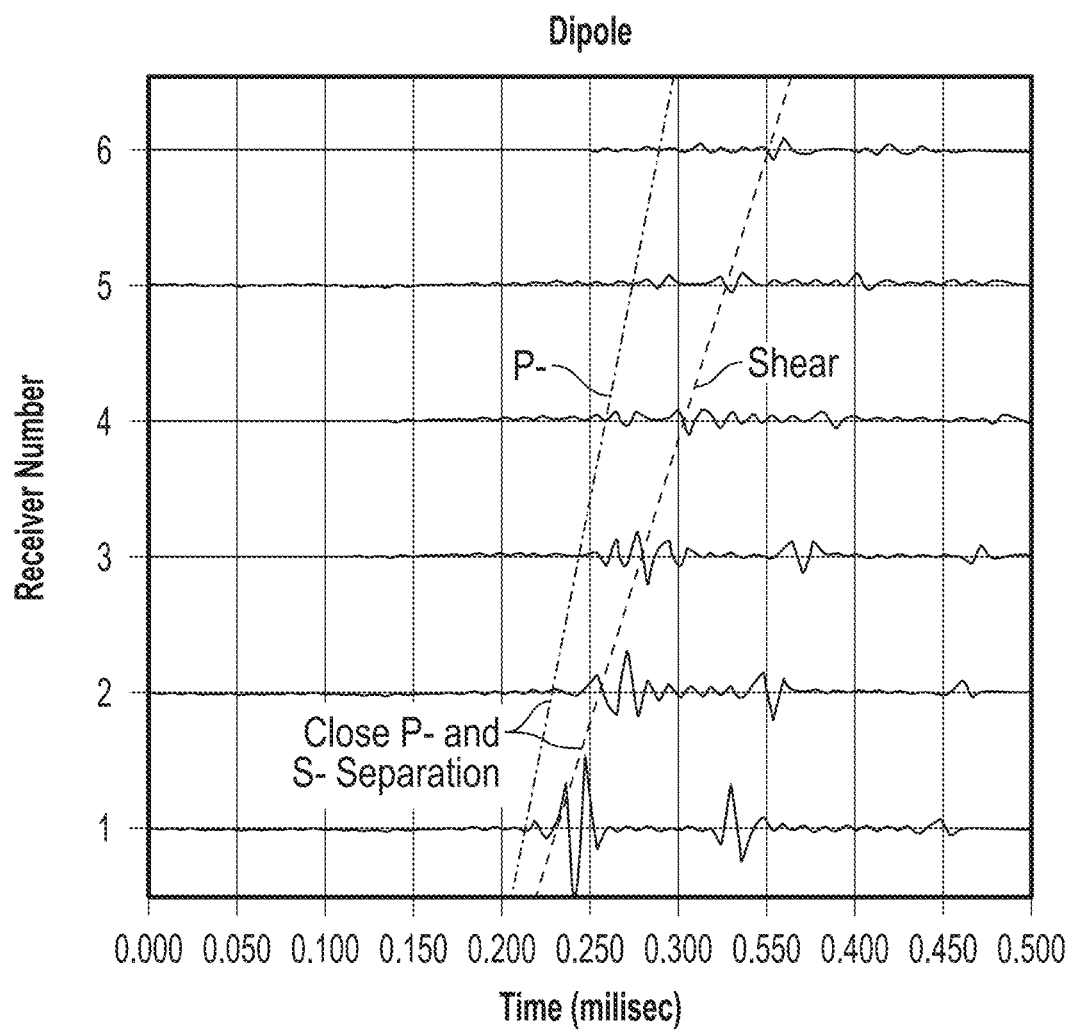

FIGS. 11A and 11B illustrate simulated critically refracted compressional and shear waves excited in accordance with embodiments of the present disclosure. FIG. 9A shows critically refracted compressional and shear waves excited using a monopole transmitter. FIG. 9B shows critically refracted compressional and shear waves excited using a dipole transmitter. Both waves were excited at 125 kHz with a T-R spacing of 12 inches and R-R spacing of 1.5 inches. The model uses a relatively fast formation having a compressional sonic travel time (DTp) of 120 microseconds per foot and a shear sonic travel time (DTs) of 190 microseconds per foot and a density of 2.4 grams per cubic centimeter with no tool.

Figure 12:
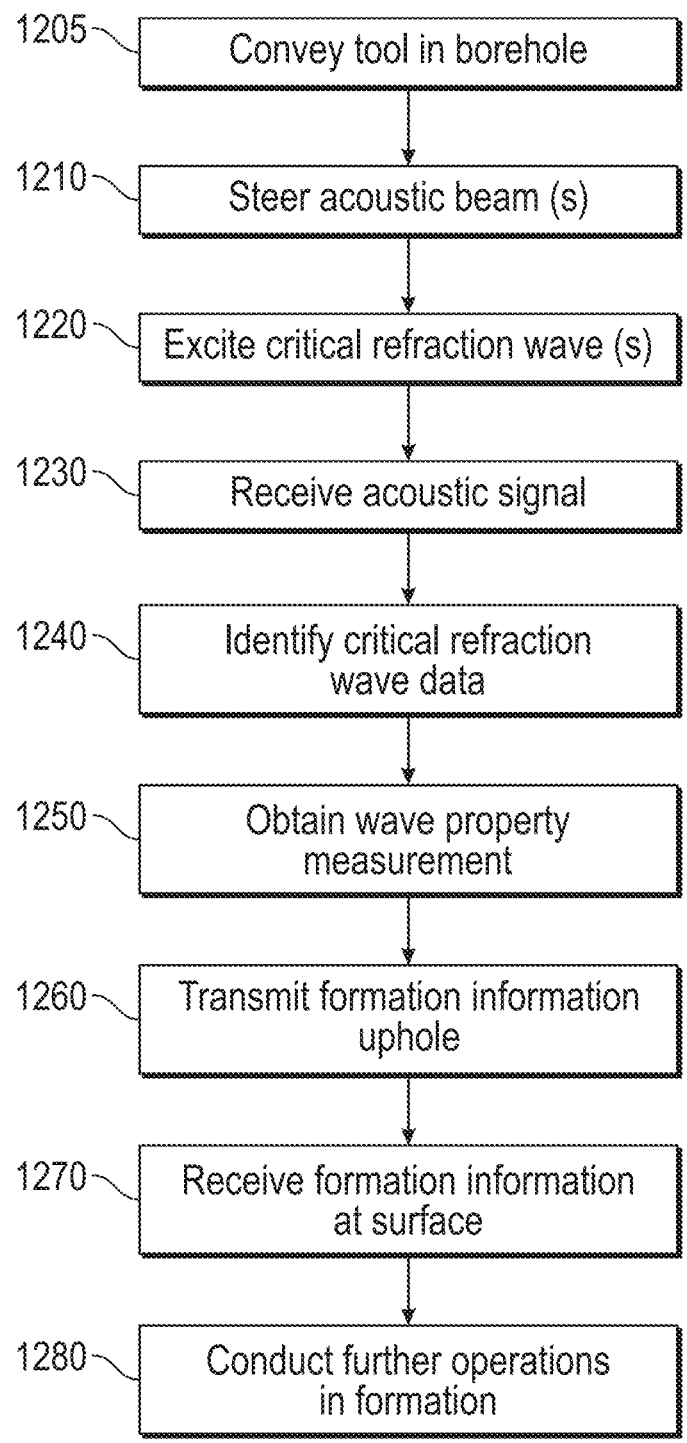
FIG. 12 shows a flow chart illustrating methods for performing formation evaluation in a borehole intersecting an earth formation in accordance with embodiments of the present disclosure.

FIG. 12 shows a flow chart 1200 illustrating methods for performing formation evaluation in a borehole intersecting an earth formation in accordance with embodiments of the present disclosure. In optional step 1205, an acoustic well logging tool is conveyed in a borehole using a carrier. The borehole may be filled with downhole fluid. Step 1210 comprises steering an acoustic beam from at least one ultrasonic transmitter to an interface in the formation to intercept the interface at a critical angle. The interface may be, for example, borehole fluid-solid boundary. The acoustic beam(s) may be steered to multiple angles—that is, more than one beam may be steered to their respective angles that are different critical angles, one beam may be steered to a plurality of different angles, the same beam may be swept over various angles, or combinations of these.

Step 1220 may include exciting at a first borehole depth at least one critical refraction wave from one or more acoustic beams transmitted by at least one ultrasonic transmitter. The acoustic beam is configured to generate formation refracted waves. This may include generating critically refracted formation compressional and shear head waves and other waves such as borehole guided waves, and reflected waves from a discontinuity inside the formation. The at least one critical refraction wave excited by the acoustic beam may produce at least one of: i) a compressional head wave; ii) a shear head wave; iii) a borehole guided wave (e.g., a Rayleigh and/or Stoneley wave mode); and iv) a reflected wave from a discontinuity boundary from the wellbore wall and inside the formation (e.g., reflector reflection from fracture or thin bed).

Method 1200 may be carried out in both open-hole and cased hole applications, and thus may operate to "look behind" the casing. Thus the interface may lie at a radial distance from a longitudinal axis of the tool equal to at least one of: i) a distance from the longitudinal axis of the tool to a wall of the borehole; and ii) a second distance greater than the distance from the longitudinal axis of the tool to the wall of the borehole. In some embodiments, flexural wave modes may be generated to evaluate casing, cement, or bond quality. In the open-hole (and other) contexts, the interface may be a fluid-solid interface. In step 1220, the acoustic beam may be one of a plurality of acoustic beams. Thus, steps 1210 and 1220 may be carried out by using the at least one ultrasonic transmitter to generate the plurality of acoustic beams on a single trip in the borehole.

As described above, individual transmitters, groups of transmitters, or arrays of multiple transmitters may be configured to steer and focus incident ultrasonic beams onto fluid-formation interface, sweeping over a volume of the formation at a wide range of incident angles for exciting critical refraction compressional and shear waves.

Step 1230 comprises receiving an acoustic signal comprising critical refraction wave data at a logging tool in the borehole. The acoustic signal may be a formation acoustic signal including head compressional and shear waves, borehole guided waves, reflected waves, and the like. Step 1230 of the method 1200 may include obtaining acoustic wave data with the acoustic well logging tool by generating a response signal at at least one acoustic receiver on the logging tool responsive to the acoustic signal.

Optional step 1240 comprises identifying critical refraction wave data within the response signal corresponding to the at least one critical refraction wave. Each acoustic beam of the plurality may have a unique effective angle of incidence with the interface. That is, a first beam of the plurality of acoustic beams has a first angle of incidence and a second beam of the plurality of acoustic beams has a second angle of incidence different than the first angle of incidence. The acoustic signal may result from the plurality of acoustic beams, and may include at least one critical refraction wave excited by the acoustic beam of the plurality of acoustic beams.

Identifying critical refraction wave data may include separating formation acoustic wave signals and compressional and shear wave signals; and determining optimal signals, which are representative of critical refraction waves, using signal quality factors (signal strength, semblance peak, and phase coherence, etc.) from the received signals from a plurality of the steered incident waves. That is, optimal signals may be determined based on quality of signal and slowness mode using signal strength, slowness-semblance map, and phase coherence. Thus, received signals from different steered incident angles may be sorted according to signal quality, as well as differentiating critical refraction and non-critical refraction waves. In various configurations, the optimal signal may be the highest quality signal(s) based on statistically determined measures, thresholds, or other profiles including combinations of these.

For example, this may be carried out by performing coherence processing on at least a portion of the acoustic wave data to generate a coherence map. Identifying the critical refraction wave data may include identifying local maxima in the coherence map, wherein the local maxima are representative of the data. Step 1240 may include detection of the on-set of formation compressional wave and shear waves using a multiple-receiver array at respective optimum incident angles, for identifying the onset of formation compressional and shear wave velocity at respective incident beam angles without much of mutual mode interference, and determining formation acoustic velocity more accurately.

Step 1250 may comprise obtaining a wave property measurement from the critical refraction wave data. Step 1250 may include processing critical refraction wave data to obtain formation acoustic properties (e.g., wave velocity, attenuation, etc.). Formation wave properties may be obtained from the measured formation acoustic signals. The wave property measurement may comprise at least one of: i) a compressional velocity measurement; ii) a shear velocity measurement; iii) a compressional wave attenuation measurement; iv) a shear wave attenuation measurement; v) a borehole guided wave velocity measurement; vi) a borehole guided wave attenuation measurement; and properties of reflected signals from a boundary within the formation. See for example, U.S. Pat. No. 6,985,086 to Tang et al.; U.S. patent application No. 2004/0095847 to Hassan et al.; U.S. Pat. No. 7,672,784 to Tang et al.; U.S. patent application No. 2015/0268367 to Khajeh et al.; U.S. Pat. No. 8,456,952 to Tang et al; U.S. Pat. No. 9,063,251 to Khajeh et al.; and U.S. Pat. No. 9,389,330 to Khajeh et al., each incorporated herein in its entirety.

Compensated measurement (with a top and bottom transmitter arrays, and a middle multiple-receiver array) provides high-resolution, as well as more reliable formation velocity and attenuation determination, while minimizing tool tilt and wellbore rugosity effects. Acoustic compressional and shear wave attenuations may be determined from signal decay of receiving transducers and from compensation methods (using the firing of the top and bottom transmitter arrays).

Optional methods may include using the parameter of interest to estimate a characteristic of a formation. Estimation of the parameter may include the use of a model. In some embodiments, the model may include, but is not limited to, one or more of: (i) a mathematical equation, (ii) an algorithm, (iii) an deconvolution technique, and so on. Reference information accessible to the processor may also be used.

Optional step 1260 comprises transmitting formation information uphole. Optional step 1270 comprises receiving the formation information at the surface in near real-time with respect to initiating the generation of the plurality of multipole acoustic signals. Optional step 1280 may comprise conducting further operations in the formation in dependence upon the formation information. Further operations may comprise performing at least one of: i) estimating a formation porosity from the wave property measurement; ii) detecting a fracture with the wave property measurement; iii) estimating a fracture location with the wave property measurement; iv) estimating a fracture orientation with the wave property measurement; v) estimating Poisson's ratio of the formation with the wave property measurement; vi) estimating Young's modulus of the formation with the wave property measurement; vii) estimating a bulk modulus of the formation with the wave property measurement; viii) estimating a shear modulus of the formation with the wave property measurement; ix) conducting fluid typing of a fluid in the formation with the wave property measurement; and x) estimating a fluid saturation for a fluid of the formation with the wave property measurement. In some cases critical refraction wave data may be processed downhole to obtain formation acoustic properties. These properties may be transmitted to the surface for post-processing to obtain the additional formation properties and analyze features, such as, for example, geo-mechanical parameters, porosity, fluid saturation, fracture parameters, layer/lamination orientation, anisotropy, etc.

Method embodiments may include conducting further operations in the earth formation in dependence upon formation information, wave property measurements, estimated properties of the reflector(s), or upon models created using ones of these. Further operations may include at least one of: i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation information.

Further methods may include exciting at a second borehole depth different than the first borehole depth another critical refraction wave by steering a second acoustic beam transmitted by the at least one ultrasonic transmitter to the interface to intercept the interface at a second critical angle different than the first critical angle; receiving a second acoustic signal comprising additional critical refraction wave data at the logging tool; and obtaining a second wave property measurement from the additional critical refraction wave data.

Further methods may include exciting a second critical refraction wave at the first borehole depth by steering a second acoustic beam transmitted by the at least one ultrasonic transmitter to the interface to intercept the interface at a second critical angle different than the first critical angle; obtaining a second wave property measurement from additional critical refraction wave data representing the second critical refraction wave at the first borehole depth, wherein the acoustic signal comprises the additional critical refraction wave data.

Further methods may include exciting a second critical refraction wave at the first borehole depth by steering a second acoustic beam transmitted by the at least one ultrasonic transmitter to the interface to intercept the interface at the first critical angle at a frequency different than the frequency of the first critical refraction wave; obtaining a second wave property measurement from additional critical refraction wave data representing the second critical refraction wave at the first borehole depth, wherein the acoustic signal comprises the additional critical refraction wave data.

Further methods may include orienting one or more of the at least one ultrasonic transmitter at an angle with respect to a longitudinal axis of the logging tool resulting in flexural wave energy sufficient to produce a shear head wave in an acoustically slow formation.

Further methods may include exciting at least one additional critical refraction wave at each of a plurality of additional azimuths at a plurality of borehole depths; receiving an acoustic signal comprising critical refraction wave data at the logging tool at each of the plurality of additional azimuths at the plurality of borehole depths in the borehole; obtaining a plurality of wave property measurements from the critical refraction wave data; and generating a full-resolution two-dimensional image of the property for the borehole.

Estimated parameters of interest may be stored (recorded) as information or visually depicted on a display (e.g., for an operating engineer). The parameters of interest may be transmitted before or after storage or display. For example, information may be transmitted to other downhole components or to the surface for storage, display, or further processing. Aspects of the present disclosure relate to modeling a volume of an earth formation using the estimated parameter of interest, such as, for example, by associating estimated parameter values with portions of the volume of interest to which they correspond, or by representing the boundary and the formation in a global coordinate system. The model of the earth formation generated and maintained in aspects of the disclosure may be implemented as a representation of the earth formation stored as information. The information (e.g., data) may also be transmitted, stored on a non-transitory machine-readable medium, and/or rendered (e.g., visually depicted) on a display.

The processing of the measurements by a processor may occur at the tool, the surface, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

Acoustic logs are records of the receipt, at successive borehole depth levels, of acoustic signals by receivers which are spaced along the length of a borehole tool from each other and from at least one transmitter of acoustic signals.

The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "processor" or "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on. Thus, a processor may be configured to perform one or more methods as described herein, and configuration of the processor may include operative connection with resident memory and peripherals for executing programmed instructions.

As used herein, the term "fluid" and "fluids" refers to one or more gasses, one or more liquids, and mixtures thereof. A "downhole fluid" as used herein includes any gas, liquid, flowable solid and other materials having a fluid property and relating to hydrocarbon recovery. A downhole fluid may be natural or man-made and may be transported downhole or may be recovered from a downhole location. Non-limiting examples of downhole fluids include drilling fluids, return fluids, formation fluids, production fluids containing one or more hydrocarbons, engineered fluids, oils and solvents used in conjunction with downhole tools, water, brine, and combinations thereof. An "engineered fluid" may be used herein to mean a human made fluid formulated for a particular purpose. The term "engage," as used herein, may be defined as in contact with the borehole wall, urged against the borehole wall, or positioned proximate the borehole wall. The term "proximate," as used herein, may be defined as being near the borehole with no intervening infrastructure interfering with measurements using physical phenomena taking place at least in part in the formation useful in evaluating the borehole, earth formation, or both. The term "geosteering" may refer to changing direction of the drill bit, stopping progression of the drill bit, or continuing advancement of the drill bit. The term "borehole wall" refers to a portion of a tubular edge of the formation defined by the extent of the formation in contrast to the borehole or installed infrastructure in the borehole (e.g., cement, casing, etc.).

It apparent that the values of slowness and velocity may be used interchangeably in the techniques disclosed herein. The parameters slowness and velocity are inversely related and the measurement of either may be converted to the other by simple mathematical relations that are well known in the art. Thus, the term "slowness" as used herein may refer to slowness as traditionally understood, as well as other parametric equivalents.

While the foregoing disclosure is directed to the one mode embodiments of the disclosure, various modifications will be apparent to those skilled in the art. It is intended that all variations be embraced by the foregoing disclosure.

What is claimed is:

1. A method for performing formation evaluation in a borehole intersecting an earth formation, the method comprising:

exciting at a first borehole depth at least one critical refraction wave by steering an acoustic beam transmitted by at least one ultrasonic transmitter along a transmitter beam sweep through a plurality of incident beam angles along an interface in the formation to an incident beam angle configured to result in the acoustic beam intercepting the interface at a critical angle for critical refraction wave generation;

receiving an acoustic signal comprising critical refraction wave data at a logging tool in the borehole;

obtaining a wave property measurement from the critical refraction wave data; and performing formation evaluation comprising performing at least one of: i) estimating a formation porosity from the wave property measurement; ii) detecting a fracture with the wave property measurement; iii) estimating a fracture location with the wave property measurement; iv) estimating a fracture orientation with the wave property measurement; v) estimating Poisson's ratio of the formation with the wave property measurement; vi) estimating Young's modulus of the formation with the wave property measurement; vii) estimating a bulk modulus of the formation with the wave property measurement; viii) estimating a shear modulus of the formation with the wave property measurement; ix) conducting fluid typing of a fluid in the formation with the wave property measurement; x) estimating a fluid saturation for a fluid of the formation with the wave property measurement; xi) estimating a formation compressional wave slowness; and xii) estimating a formation shear wave slowness.

2. The method of claim 1 wherein the interface lies at a radial distance from a longitudinal axis of the tool equal to at least one of: i) a distance from the longitudinal axis of the tool to a wall of the borehole; and ii) a second distance greater than the distance from the longitudinal axis of the tool to the wall of the borehole.

3. The method of claim 1 wherein the acoustic beam is one of a plurality of acoustic beams, and wherein exciting the at least one critical refraction wave comprises:

using the at least one ultrasonic transmitter to generate the plurality of acoustic beams on a single trip in the borehole, each acoustic beam of the plurality having an effective angle of incidence with the interface;

generating a response signal at least one acoustic receiver on the logging tool responsive to the acoustic signal, the acoustic signal resulting from the plurality of acoustic beams, wherein the acoustic signal comprises at least one critical refraction wave excited by the acoustic beam of the plurality of acoustic beams; and identifying critical refraction wave data within the response signal corresponding to the at least one critical refraction wave; and obtaining the wave property measurement from the critical refraction wave data.

4. The method of claim 3 wherein identifying critical refraction wave data comprises:

separating formation acoustic wave signals and compressional and shear wave signals; and identifying optimal signals using signal quality factors.

5. The method of claim 1 wherein the at least one critical refraction wave excited by the acoustic beam comprises at least one of: i) a compressional head wave; ii) a shear head wave; iii) a borehole guided wave; iv) a reflection wave from a discontinuity boundary within the formation.

6. The method of claim 1 wherein the interface comprises a fluid-solid interface.

7. The method of claim 1 wherein the wave property measurement comprises at least one of: i) a compressional velocity measurement; ii) a shear velocity measurement; iii) a compressional wave attenuation measurement; iv) a shear wave attenuation measurement; v) a borehole guided wave velocity measurement; and vi) a borehole guided wave attenuation measurement.

8. The method of claim 1 wherein the acoustic beam is one of a plurality of acoustic beams and wherein the acoustic beam has a first angle of incidence and a second beam of the plurality of acoustic beams has a second angle of incidence different than the first angle of incidence.

9. The method of claim 1 further comprising estimating a location in the formation for the interface.

10. The method of claim 1 further comprising:

exciting at a second borehole depth different than the first borehole depth another critical refraction wave by steering a second acoustic beam transmitted by the at least one ultrasonic transmitter to the interface to intercept the interface at a second critical angle different than the first critical angle;

receiving a second acoustic signal comprising additional critical refraction wave data at the logging tool; and obtaining a second wave property measurement from the additional critical refraction wave data.

11. The method of claim 1 further comprising:

exciting a second critical refraction wave at the first borehole depth by steering a second acoustic beam transmitted by the at least one ultrasonic transmitter to the interface to intercept the interface at a second critical angle different than the first critical angle;

obtaining a second wave property measurement from additional critical refraction wave data representing the second critical refraction wave at the first borehole depth, wherein the acoustic signal comprises the additional critical refraction wave data.

12. The method of claim 1 further comprising:

exciting a second critical refraction wave at the first borehole depth by steering a second acoustic beam transmitted by the at least one ultrasonic transmitter to the interface to intercept the interface at the first critical angle at a frequency different than the frequency of the first critical refraction wave;

obtaining a second wave property measurement from additional critical refraction wave data representing the second critical refraction wave at the first borehole depth, wherein the acoustic signal comprises the additional critical refraction wave data.

13. The method of claim 1 further orienting one or more of the at least one ultrasonic transmitter at an angle with respect to a longitudinal axis of the logging tool resulting in flexural wave energy sufficient to produce a shear head wave in an acoustically slow formation.

14. The method of claim 1 comprising exciting at least one additional critical refraction wave at each of a plurality of additional azimuths at a plurality of borehole depths;

receiving an acoustic signal comprising critical refraction wave data at the logging tool at each of the plurality of additional azimuths at the plurality of borehole depths in the borehole; and obtaining a plurality of wave property measurements from the critical refraction wave data; and generating a full-resolution two-dimensional image of the property for the borehole.

15. The method of claim 1 wherein a center of mass of the logging tool is eccentered in the borehole.

16. The method of claim 1 further comprising conducting further operations in dependence upon the wave property measurement.

17. The method of claim 16 wherein the further operations comprise at least one of:

i) geosteering; ii) drilling additional boreholes in the formation; iii) performing additional measurements on the formation; iv) estimating additional parameters of the formation; v) installing equipment in the borehole; vi) evaluating the formation; vii) optimizing present or future development in the formation or in a similar formation; viii) optimizing present or future exploration in the formation or in a similar formation; ix) drilling the borehole; and x) producing one or more hydrocarbons from the formation information.

18. The method of claim 1 wherein the at least one critical refraction wave propagates at least one of: i) circumferentially in the formation around the borehole; and ii) helically in the formation around the borehole.

19. A well logging system for logging in a borehole intersecting an earth formation, the system comprising:

at least one ultrasonic transmitter in the borehole configured to excite at a first borehole depth at least one critical refraction wave by steering an acoustic beam transmitted by the at least one ultrasonic transmitter along a transmitter beam sweep through a plurality of incident beam angles along an interface in the formation to an incident beam angle configured to result in the acoustic beam intercepting the interface at a critical angle for critical refraction wave generation;

at least one receiver in the borehole configured to receive an acoustic signal comprising critical refraction wave data at a logging tool in the borehole;

at least one processor on the tool configured to a obtain a wave property measurement from the critical refraction wave data.

* * * * *